United States Patent
Sherman et al.

(10) Patent No.: US 6,463,279 B1
(45) Date of Patent: *Oct. 8, 2002

(54) CHANNEL FREQUENCY ALLOCATION FOR MULTIPLE-SATELLITE COMMUNICATION NETWORK

(75) Inventors: Richard H. Sherman, Fremont; Theodore F. Driggers, Boulder Creek, both of CA (US)

(73) Assignee: Globalstar L.P., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/441,680

(22) Filed: Nov. 17, 1999

(51) Int. Cl.$^7$ ................................................ H04Q 7/20

(52) U.S. Cl. ...................... 455/427; 455/450; 455/12.1; 455/13.2

(58) Field of Search ............................... 455/12.1, 13.2, 455/13.3, 13.4, 13.1, 450, 451, 452, 427

(56) References Cited

U.S. PATENT DOCUMENTS

| RE32,905 E | 4/1989 | Baran .......................... 370/104 |
|---|---|---|
| 4,901,307 A | 2/1990 | Gilhousen et al. ............. 370/18 |
| 5,010,317 A | 4/1991 | Schwendeman et al. . 340/311.1 |
| 5,073,900 A | 12/1991 | Mallinckrodt ................... 375/1 |
| 5,081,703 A | 1/1992 | Lee .............................. 455/13 |
| 5,109,390 A | 4/1992 | Gilhousen et al. .............. 375/1 |
| 5,119,225 A | 6/1992 | Grant et al. ................. 359/172 |
| 5,216,427 A | 6/1993 | Yan et al. .................... 342/352 |
| 5,233,626 A | 8/1993 | Ames .............................. 375/1 |
| 5,239,671 A | 8/1993 | Linquist et al. ............ 455/13.1 |
| 5,265,119 A | 11/1993 | Gilhousen et al. .............. 375/1 |
| 5,303,286 A | 4/1994 | Wiedeman ..................... 379/59 |
| 5,327,572 A | * 7/1994 | Freeburg ................... 455/13.1 |
| 5,329,547 A | * 7/1994 | Ling ........................... 370/342 |

(List continued on next page.)

FOREIGN PATENT DOCUMENTS

| EP | 0 421 698 A2 | 10/1991 |
|---|---|---|
| WO | WO 90/13186 | 11/1990 |
| WO | WO 91/09473 | 6/1991 |
| WO | WO 93/09613 | 5/1993 |

OTHER PUBLICATIONS

US 5,415,368, 5/1995, Horstein et al. (withdrawn)
Petition of American Mobile Satellite Corporation Before the FCC, Washington, DC 20554, dated Jun. 3, 1991, pp. 1–15.
Application of Motorola Satellite Communications, Inc. for Iridium A Low Earth Orbit Mobile Satellite System before the FCC, Washington, D.C. Dec. 1990, pp. 49–96.

(List continued on next page.)

Primary Examiner—Edward F. Urban
Assistant Examiner—Sheila Smith
(74) Attorney, Agent, or Firm—Perman & Green, LLP

(57) ABSTRACT

A method and apparatus (system) for providing forward-link channel-frequency allocation for multiple-satellite cellular communications networks is disclosed. The system has a centralized ground-operations control center that provides bi-weekly minute-by-minute allocation plans for geographically-defined service areas. This enables each service area to set its diversity policy in accordance with the requirements of the government regulators and customer preferences within the service area. The system has a user model having a frequency re-use pattern, a channel allocation model for modelling the power allocated to each channel, and a gateway channel model for allocating channels in accordance with the user model and the channel allocation model. The allocation is made for each satellite of the plurality of satellites. The traffic allocation induces an operating frequency for each of the one or more links in each satellite of the plurality of satellites. The satellite communication system computed frequency allocation is optimized to minimize total radiation from all forward links for one or more of the plurality of satellites.

2 Claims, 12 Drawing Sheets

U.S. PATENT DOCUMENTS

| | | | |
|---|---|---|---|
| 5,339,330 A | 8/1994 | Mallinckrodt | 375/1 |
| 5,410,728 A | 4/1995 | Bertiger et al. | 455/13.1 |
| 5,422,647 A | 6/1995 | Hirshfield et al. | 342/354 |
| 5,433,726 A | 7/1995 | Horstein et al. | 244/158 R |
| 5,439,190 A | 8/1995 | Horstein et al. | 244/158 |
| 5,446,756 A | 8/1995 | Mallinckrodt | 375/200 |
| 5,448,623 A | 9/1995 | Wiedeman et al. | 379/59 |
| 5,539,730 A * | 7/1996 | Dent | 370/280 |
| 5,551,624 A | 9/1996 | Horstein et al. | 244/158 R |
| 5,590,395 A * | 12/1996 | Diekelman | 455/13.1 |
| 5,602,833 A * | 2/1997 | Zehavi | 370/209 |
| 5,608,722 A * | 3/1997 | Miller | 370/320 |
| 5,631,898 A * | 5/1997 | Dent | 370/203 |
| 5,812,538 A * | 9/1998 | Wiedeman et al. | 370/316 |
| 6,021,309 A * | 2/2000 | Sherman et al. | 455/12.1 |

OTHER PUBLICATIONS

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. For Authority to Construct a New Communications Satellite System Outsset before the FCC, Washington, D.C. 20554, May 31, 1991, pp. 33–51.

Application of Ellipsat Corporation Ellipsat for the Authority to Construct Ellipso I an Elliptical Orbit Satellite System, before the FCC, Washington, D.C. 20554, Nov. 2, 1990, pp. 5–34.

Application of Loral Cellular Systems, Corp., Globalstar Mobile Communications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, Italy, Sep. 21, 1989.

"Current and Future Mobile Satellite Communication Systems", S. Kato et al., IEICE Transactions, vol. E74, No. 8 Aug. 1991, pp. 2201–2210.

"Digital Network Oriented Mobile Radio Satellite System as an Integrated Part of the GSM Cellular Radio System in Europe", P. Dondl, Deutsch Bundespost/Fernmeldetechniches Zentralmt/Darmstadt, Fed. Rep. Germ. Sep. 21, 1989.

"The OmniTracs Mobile Satellite Communications and Positioning System", E. Tiedemann, Jr. et al., Vehicle Electronics in the 90's: Proceedings of the In'l. Congress on Transporation Electronics, 10/90.

"Software Implementation of a PN Spread Spectrum Receiver to Accommodate Dynamics", C. Cann et al., IEEE Trans, on Comm., vol. COM–25, No. 8, Aug. 1977.

"A Communication Technique for Multipath Channels", R. Price, Proceedings of the IR, Mar. 1988, pp. 555–570.

"Increased Capacity Using CDMA for Mobile Satellite Communication", K. Gillhousen et al., IEEE Journal on Selected Areas in Communications, vol. 8, No. 4, May 1990, pp. 503–514.

"The Iridium System—A Revolutionary Satellite Communications System Developed with Innovative Applications of Technology", D. Sterling et al., IEEE, Milcom 1991, Nov. 4–7.

"Iridium: Key to Worldwide Cellular Communications", J. Foley, Telecommunications, Oct. 1991, pp. 23–28.

* cited by examiner

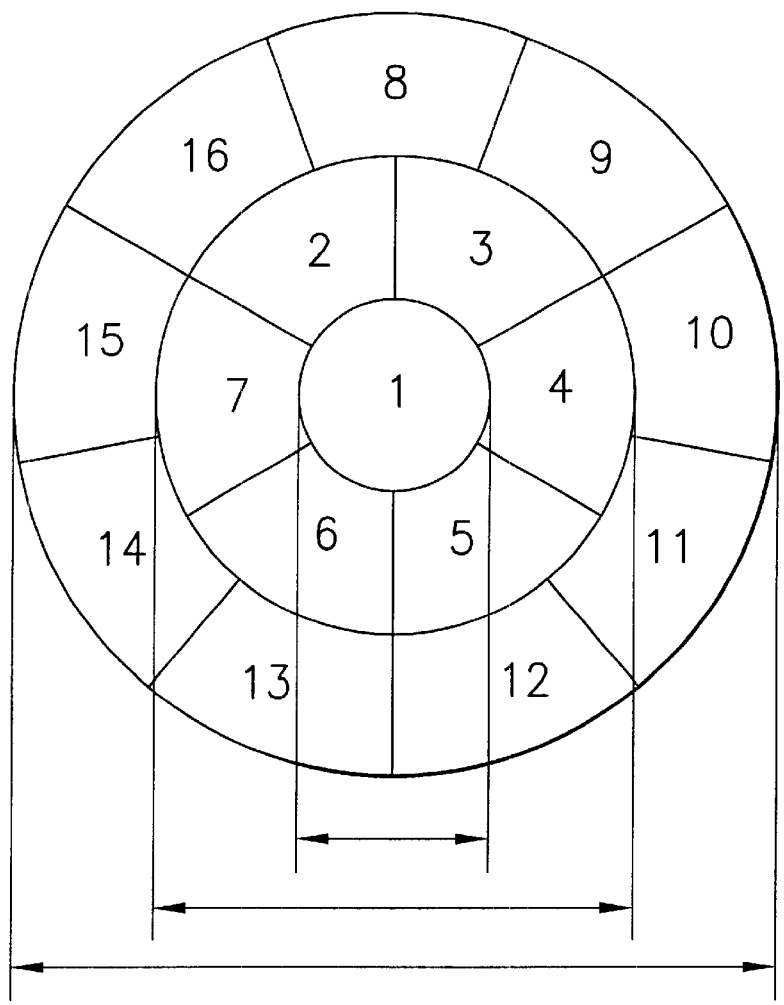
FIG.3
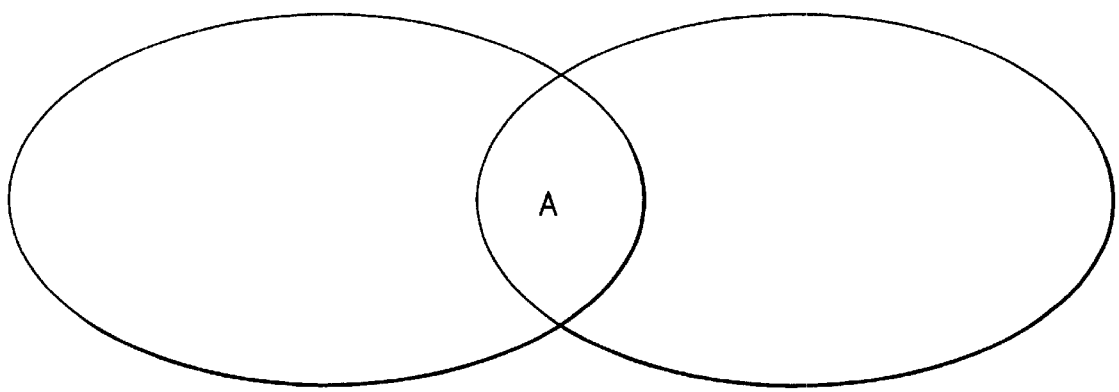
(3,23,5,{1,4,13})  FIG.4  (4,37,2,{1,7})

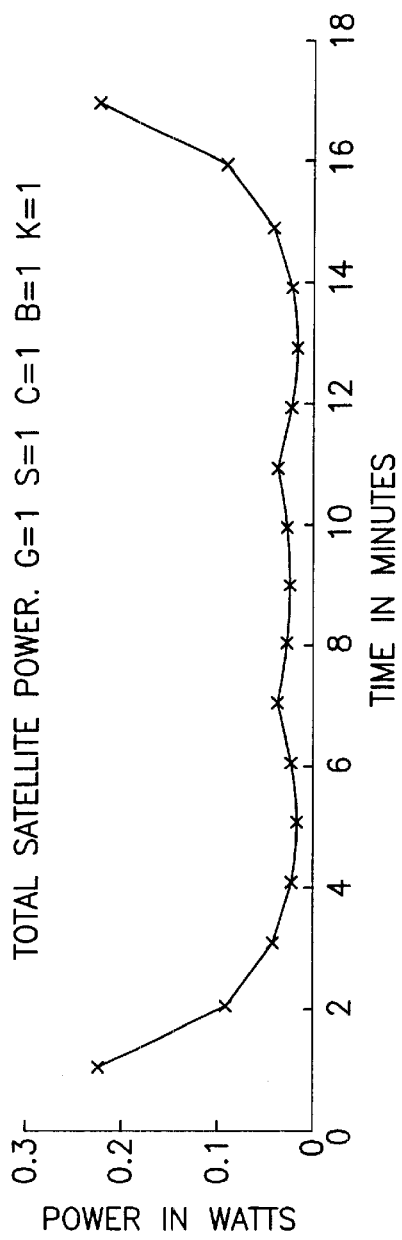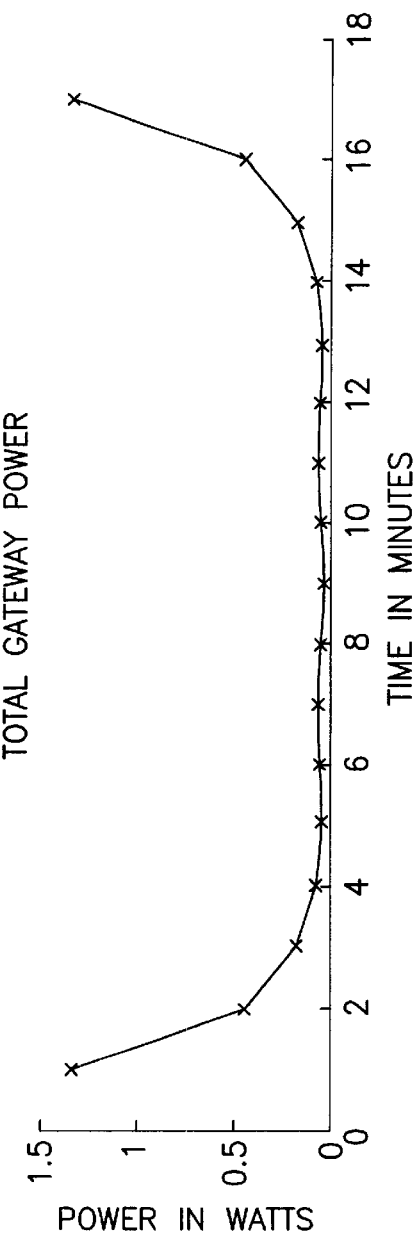

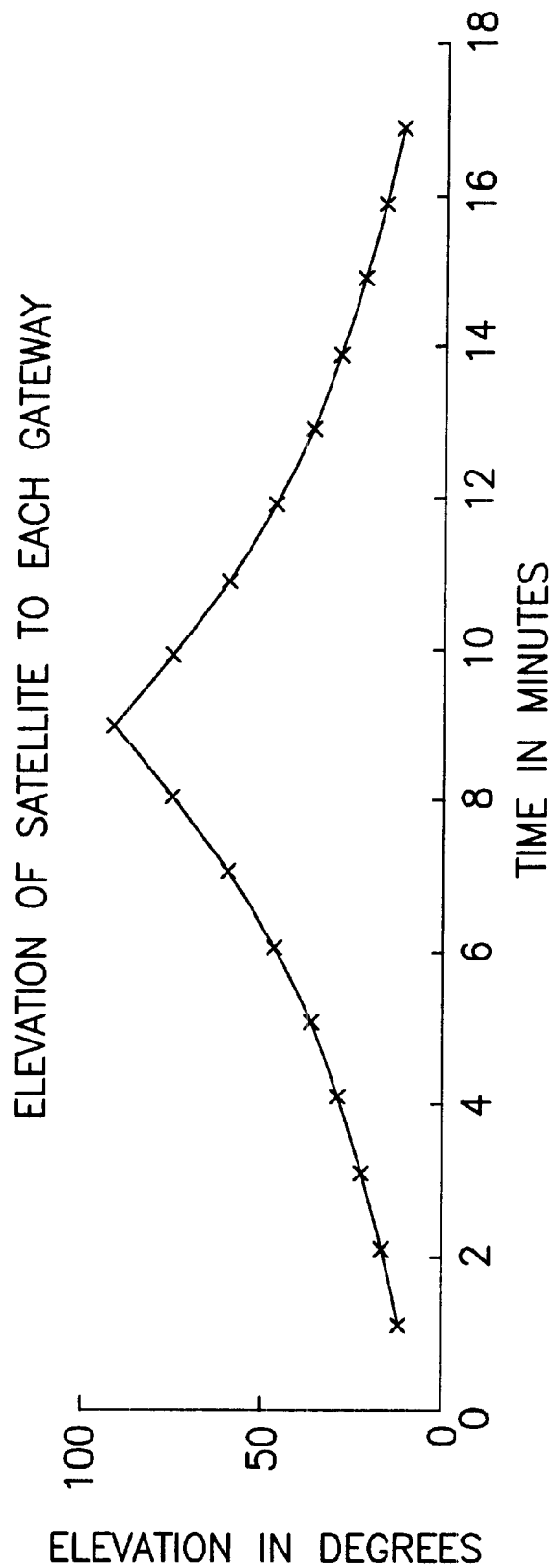

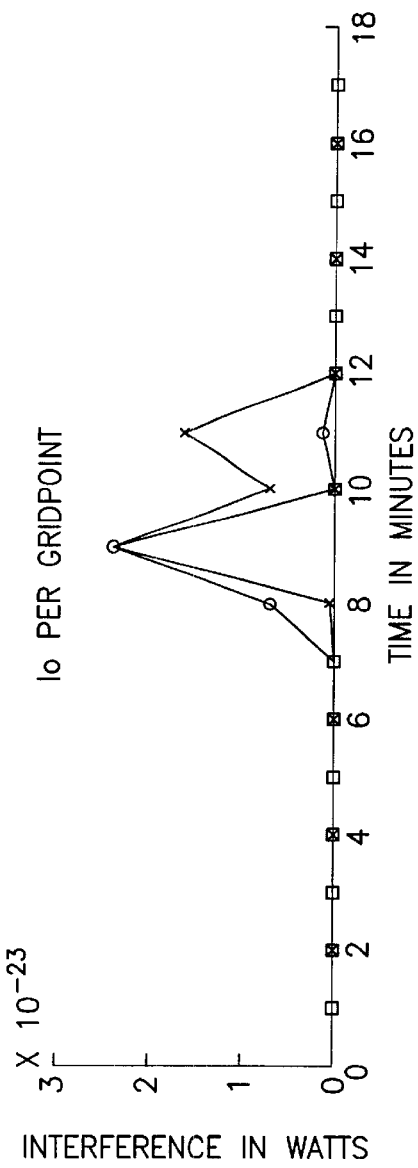
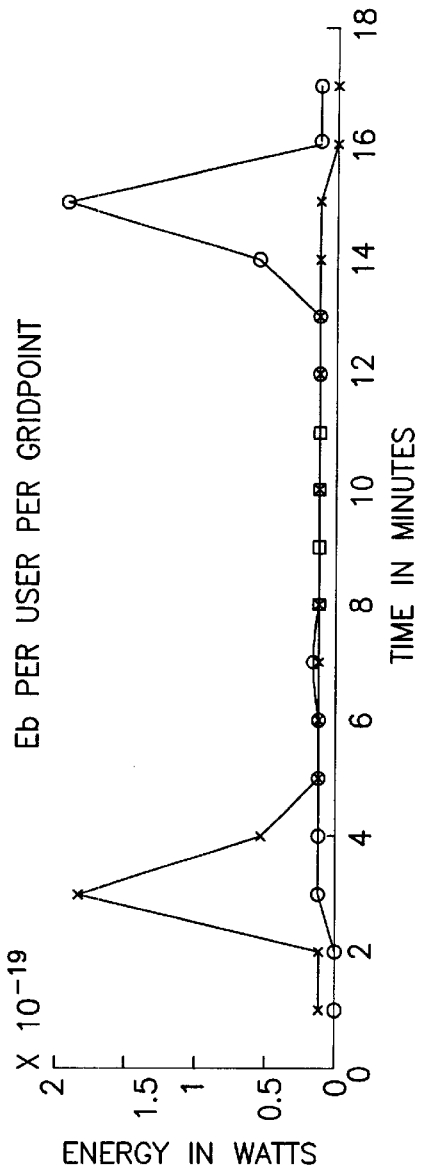

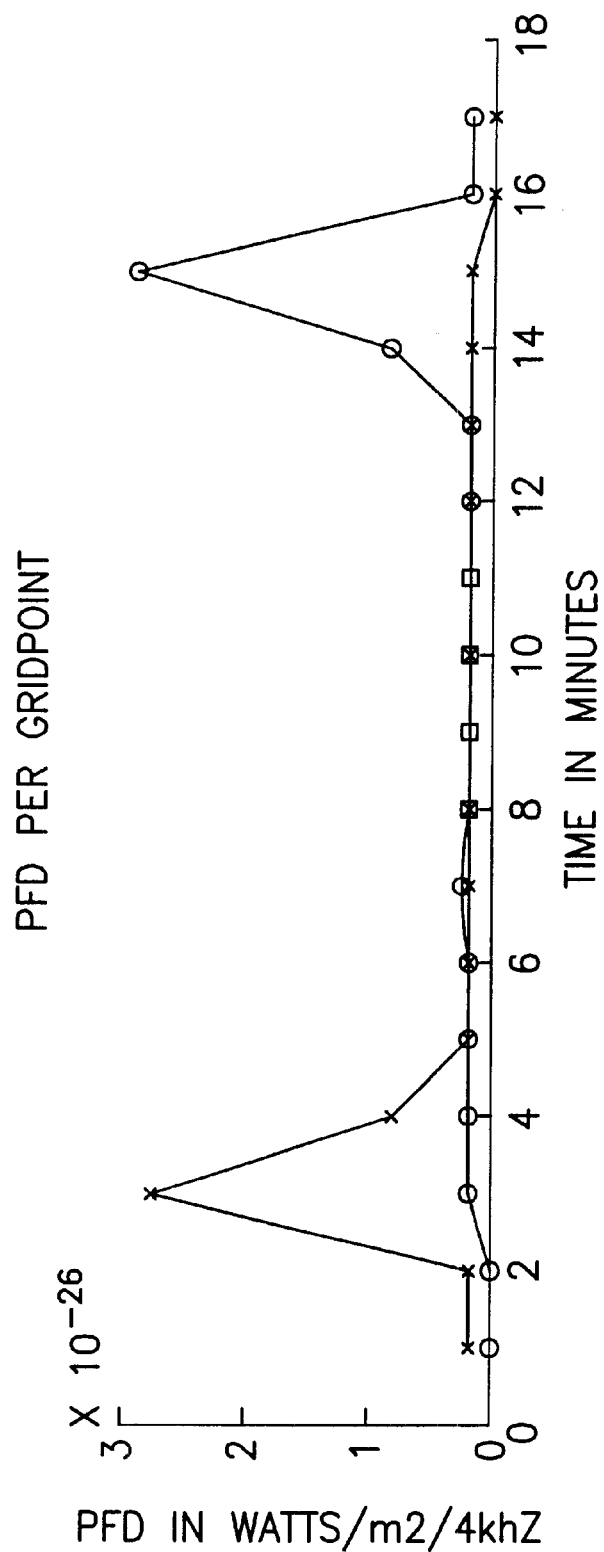

CHANNEL FREQUENCY ALLOCATION FOR MULTIPLE-SATELLITE COMMUNICATION NETWORK

BACKGROUND OF THE INVENTION

1. Field of the Invention

The present invention is related to communications-satellite network control. More particularly, it is related to channel allocation in multiple-satellite communication systems.

2. Discussion of Related Art

Terrestrial cellular communication systems are well known. Multiple Satellite communication systems complement terrestrial cellular communication systems to augment traffic handling capacity and service areas where wire or cellular networks have not reached. Satellite systems came into existence in response to the need for efficient and economical mobile communications. In general, the satellites act as a transponder, or "bent pipe", receiving ground based transmissions from one location and beaming the repeated transmission back down to another location after amplification and frequency shifting, as is discussed in U.S. Pat. No. 5,448,623, incorporated herein by reference in its entirety.

The basic principles of ground-linked cellular network operations are similar to those of the satellite-linked cellular networks. In both types of networks, a broadcast link is shared by all user terminals for network administration purposes. Each base station in a ground-cellular network has its own distinctive signal link for this purpose, serving as a "beacon" that mobile user terminals detect as they move into that base station's coverage area. The analog cellular radio system assigns channels using a frequency reuse pattern. These channel allocations require base stations for each frequency. A multiple satellite system provides channels through use of electronics on-board the spacecraft.

Mobile users initially find and select a cellular channel by searching for the strongest administrative pilot signals sent by nearby gateways as beacons. When the cellular network connects a user's call, however, that call is assigned to its own individual circuit. Each satellite in a satellite-cellular network acts as a transponder between the network and its users, repeating whatever signal it receives and beaming the repeated signal back down to earth. Many satellite transponders pass the user's call along like a simple "bent pipe" would, providing only amplification and carrier-frequency translation.

Each satellite-cellular call is carried by a circuit made up of two-way links between a user and the satellite, and between the satellite and a gateway that links the satellite into ground-based communications networks as well as other satellite links. Cellular networks use three basic multiplexing techniques: Frequency-Division Multiple Access (FDMA); Code-Division Multiple Access (CDMA); and synchronous or asynchronous Time-Division Multiple Access (TDMA). The individual links will be pairs of carrier frequencies, pairs of CDMA tone or keycode references, or pairs of TDMA time-slice sequences or digitally-addressed packets.

In CDMA ground-cellular networks, only one fixed-bandwidth channel frequency need be assigned to each individual base station, since that channel is then multi-plexed using spread-spectrum techniques that incorporate individual links into the channels carrier-frequency band using respective clock or keycode signals. For example the "128-Ary" Walsh-spreading codes can define 128 different spread-spectrum links per channel. Thus CDMA encoding can use its portion of the spectrum efficiently, but the frequencies it uses must all be contiguous.

In satellite-cellular networks, individual gateways characteristically support a much larger number of users than individual ground-cellular base stations. Therefore CDMA satellite networks require even more bandwidth than CDMA ground networks, making the use of non-contiguous frequencies in hybrid FDMA/CDMA networks' over-all bandwidth particularly advantageous for satellite-cellular networks. In hybrid FDMA/CDMA multiplexing, each FDMA channel is a separate CDMA encoding system.

Wide bands of contiguous carrier frequencies are available within the present world-wide spectrum allocation plan above 20 Ghz. However, lower, L-band and S-band frequencies between 1.61 GHz and 2.5 GHz, and C-band frequencies between 5 GHz and 7.075 GHz, are more advantageous for satellite-cellular operations. These frequencies are less sensitive to the attenuation and cross-polarization interference effects of rain and other atmospheric conditions encountered in the 1414 km low earth orbits used for satellite-cellular communications links. Thus the hybrid FDMA/CDMA coding is particularly advantageous as a means of increasing the link capacity of satellite-cellular networks at the preferred, lower end of the spectrum.

On the other hand, although CDMA encoding theoretically provides efficient use of the spectrum, the hybrid CDMA links within each FDMA channel are "soft". That is, although a given number of links can be encoded by a given spread spectrum technique, in theory, some lesser number will be usable in practice. It should be noted that the "spectral efficiency" of a network is the number of calls that can be linked, relative to the maximum possible number of links within the portion of the spectrum that is being used in a given area.

The operational CDMA link-capacity of the FDMA channels in these hybrid systems is affected by path gain, co-channel interference between FDMA channels and CDMA self-interference within one FDMA channel, among other things. Moreover, the usable link-capacity of each satellite-cellular channel is further reduced and complicated by the link diversity required by satellite motion and by satellite battery-power constraints.

These constraints introduce uncertainty into the allocation of CDMA links in response to user demand. For example, even for a simple three-gateway region having only two satellites in view, the calculation of actual CDMA link capacity for one FDMA channel consumes two weeks of computing time on a high performance computer system. Uncertainty about the usable capacity of an FDMA channel can result in under-utilization, and so, can impair the actual, attainable spectral efficiency of FDMA/CDMA networks.

Several satellite-cellular networks using digitally-addressed TDMA packets similar to those used in conventional fiber-optic networks are known in the prior art. One example is the Teledesic[SM] TDMA network. This type of multiplexing also provides theoretical spectral efficiency, without the wasteful complex capacity variability of CDMA networks.

However, packet-based TDMA satellite-cellular technology also requires large blocks of contiguous frequencies, blocks that are only available in the weather-sensitive gigahertz frequencies at the high end of the spectrum. Also, TDMA traffic is highly sensitive to time jitter, which necessitates the use of fixed tiling and complex, expensive, error prone "steerable-beam" satellite equipment, to protect the continuity of each link's time base.

Thus, a CDMA satellite network has distinct advantages over TDMA satellite networks, if the set of peculiarly troublesome CDMA link-allocation problems inherent in such network operations are solved.

Cell Size Parameters

FDMA-type ground-cellular networks are organized into individual "cells". Each cell in a ground-cellular network has a respective administrative pilot-signal, and a cell radius that is defined, operationally, by the power of the pilot signal transmitted by the cell's terrestrial base station. The coverage area for a given satellite is its "footprint", i.e., the projection of its beams onto the earth's surface. As is well known, the extent of the area covered by a satellite's footprint is determined by the satellite's height above the earth and the geometry of the satellite's transmitting antenna.

The size of cells in FDMA ground-cellular networks is also limited, as a practical matter, by the power that mobile terminals need to transmit back to a base station, particularly the transmitters of hand-held cellular phones which are limited in power by health and safety concerns as well as battery power. In satellite cellular networks, the limited power of hand-held units requires the use of transiting, low-earth-orbit (LEO) satellites, rather than the geostationary satellites (i.e., satellites that can be conveniently fixed at a point in space relative to a point on the earth).

Because LEO satellites are not geostationary, these satellites can move into and/or out of range during a call. Thus an overlap between the areas served by respective satellites that provide the same channel is desirable. Link diversity (i.e., more than one beam or satellite having the channel assigned to a given call) is needed to prevent interruption of the call by a frequency change when the satellite transponder previously being used by that call moves out of range.

Tiling (i.e., the assignment of a satellite channel to a geographically-defined area similar to the "cell" in FDMA ground-cellular networks) permits multiple LEO satellites to provide a given channel to a given user, rather than forcing the user to change channels when changing beams or satellites. This is particularly advantageous for LEO satellite networks.

In the prior art, one TDMA network, for example, proposes that rows of constant-spaced tiles be aligned along the earth's latitudes. However, this rigid pattern results in some areas being underserved while others nearby have excess capacity, and satellite diversity is not provided. Tiling, however, provides a convenient way of controlling channel-frequency reuse that is independent of LEO satellites' relative motion. By defining the diameter of each tile relative to the minimum beam width, tiling can also be used to set a minimum separation distance for channel reuse, in terms of the assignment of a channel to particular tiles having a fixed geometric relation to each other on the earth's surface.

Geographic Separation and Interference

In either satellite-cellular or ground-cellular networks, more user traffic can be accommodated if geographically-smaller cells are used. However, each nearby cell in an FDMA ground-cellular network uses a different channel frequency to avoid co-channel interference typically referred to as "crosstalk". FDMA ground cellular networks "reuse" frequencies by assigning them to multiple cells to accommodate additional user circuits. These cells can only reuse frequencies if they are at least some geographical distance away from other cells using that same frequency, to avoid co-channel interference, as noted by William C. Y. Lee, in a publication entitled *Mobile Communications Design Fundamentals,* Wiley & Sons, 1993.

The signal-to-noise interference ratio (SNIR) of a satellite-cellular network is a function of the power of adjacent beams, the power of adjacent channel frequencies and the power of the same channel frequency when it is reused by nearby terminals. The permissible range of power-flux density of satellite-related transmissions, as measured at the earth's surface, is defined by various standards, as for example the international standard ITU RR-2566.

Channel-Allocation Parameters

In hybrid FDMA/CDMA ground-cellular networks, the strength of a set of secondary CDMA-pilot signals for each link may also limit the maximum number and geographical radius of their respective cells. For LEO satellite-cellular networks, the strength of FDMA/CDMA pilot signals in the forward link is determined by propagation losses between the satellite and the gateway, and by the size of the beam footprint (i.e., the moving area covered by a beam's projection onto the earth's surface). Each satellite can provide multiple FDMA channel frequencies, and multiple CDMA links are available for each FDMA channel. However, each forward link provided by the satellite is defined by both an FDMA carrier frequency and a CDMA pilot signal produced by respective signal generators on board the satellite, and each such signal generator draws battery power.

Thus, for satellite-cellular networks, the number of forward links in each channel is a critically important operational constraint. For low cost satellites, in particular, the instantaneous power supplied to each satellite beam is an important operational constraint.

Channel and Link Diversity Policies

The amount of power needed to support the individual links required by user demand is also affected by the partitioning protocol used by the FDMA channels: a complete partitioning (CP) between gateways assures fast access and less co-channel interference, by reserving individual frequencies for the private use of one base station/gateway and its own particular group of user terminals for a particular time period. Alternatively, FDMA channels can be shared by multiple base stations/gateways and their respective user terminals, either completely (SC) or up to some cutoff (CO), to conserve spectrum and reduce the number of FDMA beacons and CDMA pilot frequencies needed.

In SC, CP/SC and CO networks, one call from a given cell may simultaneously be assigned to the same frequency on multiple satellites, to provide "link diversity". Satellite and link diversity can increase the number of hard handoffs (i.e., the carrier frequency changes that occur during a call). In general, hard handoffs occur in cellular networks when mobile users move into an adjacent cell's coverage area. In a LEO satellite-cellular network, they also occur when a satellite's coverage area moves away from a user, even when the user is stationary. Thus hard hand-offs can happen much more often in satellite-cellular networks. For example, according to AMPs (the analog cellular network standard), as a user passes from one cell to an adjacent cell, a hard handoff must occur.

In satellite-cellular networks, the channel used by a mobile unit may suddenly become unavailable, even if the mobile unit has not moved, because the area where the mobile unit is located is now illuminated by a different beam from the same satellite, or even by a beam from a different satellite. Thus handoffs may occur more often in satellite-cellular networks, occurring even when the location of the user terminal is stationary.

New calls can be placed using any carrier frequency. Ground-cellular mobile users initially find and select a cellular channel by searching for the strongest administrative pilot signals sent by nearby gateways as beacons. After that, as the mobile terminal passes into the area served by a different gateway, users may be explicitly directed by a control message on the administrative channel or by a portion of the channel being received to change to a specific new channel.

Thereafter, hard-handoffs from the initial carrier frequency may produce momentary outages or "dropped" calls. Regardless of the cause, if a user terminal must change channel frequencies while a call is in progress, noise produced by that change compromises the quality of that call connection. Channel changes often affect circuit quality by causing a "click" noise or, worse, an unworkable frame error rate on a link causing the call to be dropped, either because the error rate produces excess acquisition delay, or because an excessive SNIR after acquisition has triggered a reassignment of the link by the network.

In either ground-cellular or satellite-cellular networks, if a user terminal is directed to change channels while a call is in progress, additional noise produced by that change may compromise the quality of that call circuit. Channel quality during a call is also affected by co-channel interference and self interference, fading, shadowing and signal reflection, as well as by hard and soft handoffs.

Channel allocation spectral efficiency in hybrid FDMA/CDMA ground-cellular networks is affected by the SNIR quality of the individual CDMA links within each FDMA channel, as well as the assignment of FDMA channels to users and base stations or gateways. Thus, for efficient network operation, a channel-allocation system for satellite-cellular networks must provide allocation plans that balance those competing requirements of forward-link quality and capacity against satellite power constraints.

In multiple-satellite networks, FDMA/CDMA link allocation is further complicated by the need to dynamically assign channels so that the assignment of channels to gateways is coordinated with satellites' movement as well as that of mobile users. To avoid this further complication, computers on board a conventional satellite system use steerable beams, ATM-type routing switches, 64 on-board modems, etc. and satellite-to-satellite communication links to reduce handoffs and simplify allocation of their TDMA links. However, this type of on-board control system is expensive, complex, and hence, less reliable. Also, steerable beams require a wasteful, invariant tiling of the earth's surface to maintain consistent beam registration.

Known ground-cellular channel allocation strategies do not provide satisfactory channel capacity and channel quality for satellite-cellular FDMA/CDMA networks. Any "control" action must affect the network in time to counter a disturbance. If the action is not timely, it is not effective. However, the computations required by existing channel-allocation strategies for minimizing satellite self-interference and conserving satellite battery power are too cumbersome for their results to be timely.

Also, satellite self-interference and the need to conserve satellite power both impose constraints on satellite networks' operations that are very different from those encountered in designing ground-cellular networks.

The "noise" that makes up a satellite-cellular network's SNIR is generally thermal or external noise. The interference caused by CDMA signals from other satellites using the same channel is co-channel interference. Interference that is caused by the satellite's other beams that share a FDMA channel frequency (i.e., other links in the same channel of the same beam) and "side-lobes" of the beams of the multi-beam on-board antennas used by FDMA/CDMA satellites, is generally referred to as "self-interference" and is included in the SNIR.

Co-channel interference arises when ground cellular FDMA networks assign a channel frequency to multiple base stations for frequency "reuse" by separate calls to improve their spectral efficiency. However, the assignment of one call to the same frequency at multiple adjacent base stations achieves "link diversity" that reduces hard handoffs.

This "link diversity" among two or more base stations can also improve the signals SNIR performance by eliminating the effects of the multipath reflections caused by buildings and hills in a particular physical signal path.

When using "coherent combining", ground cellular networks can assign one call to the same frequency at multiple adjacent base stations without causing co-channel interference, because these signals can be summed by the gateway. "Coherent combining" of diverse links can also eliminate blockage and improve a signal's SNIR performance by block-interleaving the phase-matched signals from two or more satellites.

Although "link-diversity" has been known and used for some time, the ability to allocate one link to two transiting, potentially-interfering satellites (i.e., the diversity that makes coherent combining possible) is not known in previous cellular-network channel-allocation systems. Instead, satellite-cellular networks typically use only one source for each link in the network to reduce self interference.

Slow Fluctuations and Sudden Infeasibility

In a ground-cellular network, the greater the power of the cell's pilot signal, the larger the coverage area of that cell is, and the number users within the cell is limited only by transmitter wattage and the available spectrum. However, when a satellite-cellular network is operating at full-traffic load, available battery power is the most critical consideration for cost effective satellites. Thus, the assignment of the satellite's forward, downlink channels (those most directly affecting its battery's condition) is definitive for the remainder of a satellite-cellular network's links.

Channel allocation must also balance battery power demand over time to maintain the maximum on-board channel capacity in a satellite-cellular network. That is, whenever one channel reaches an operating limit, such as a thermal or self-interference SNIR constraint, or a battery-power limit, then all channels on board that satellite should be operating close to that same limit, to maximize the network's capacity and stability.

However, slow power fluctuations in an individual satellites' signals, typically changes lasting several minutes, are characteristic of satellite-cellular networks even when user traffic volume is constant. Because they are slower than 1 Hz, principally caused by the variable elevation of the satellite above the horizon over time, these fluctuations in signal strength can often be countered by tactical power-control compensation. However, the magnitude and duration of these fluctuations may exceed the on-board battery-power that is available for such compensation.

Fixed-channel allocations may consider the maximum volume of user-traffic anticipated at locations in the service area, and the geometry of the satellite beams. However, when user-traffic volume is large, conventional allocation strategies may produce suboptimal, wasteful channel assignments, because they make inflexible assumptions. In particular, employing an arbitrary, fixed value for a satellite's maximum usable on-board power can unnecessarily limit the number of links available in each channel it transmits.

Analytic models that address the need to conserve satellite power in making channel allocations have been proposed. Examples of the prior art in this area are: Gagliardi, *Satellite Communications*, Lifetime Learning Publications, 1984; and J. Zander, H. Eriksson, "Asymptotic Bounds on the Performance of a Class of Dynamic Channel Assignment Algorithms", *IEEE Journal of Selected Areas in Communications*, August 1993. However, these models are oversimplified. They generally do not take satellite orbital dynamics into account, nor are they applicable to gateways that only communicate through an operational control center. Furthermore, they are designed for multiplexing individual user circuits within a single bandwidth, rather than the multiple FDMA bandwidths used by hybrid FDMA/CDMA networks.

Prior art constrained optimization methods applicable to allocation problems include Mixed Integer Programming, Greedy-Algorithm, and Graph Theoretic techniques.

Mixed-Integer Programming (MIP) methods can be used to determine a channel allocation for a particular fixed point in time that minimizes the number of channels, thus minimizing power consumed by pilot signals. However, the MIP model operates in one way for a completely-shared strategy, and another for a completely-partitioned strategy. For a completely-shared strategy, integer variables are used to assign specific channels. For a completely-partitioned strategy, integer variables assign particular channels to particular gateways. However, this either/or dichotomy between completely-shared channels and completely-partitioned channels makes it inapplicable to many types of hybrid networks.

Also, the MIP model assumes that a network's channel capacity is both constant and known, because it is a parameter value at that fixed point in time, in the model. However, since CDMA channels are "soft", the assumption that a given number of channels is always available makes it unworkable for CDMA networks.

In contrast, "Greedy-algorithm" techniques first solve the allocation problem by assuming an infinite supply of channels. The mapping of call traffic that is produced by that initial assumption is then examined and simplified using some heuristic to reduce it to the actual number of channels available. Monte Carlo simulation techniques often provide the heuristic simplification. Greedy algorithm solutions of the allocation problem are also not practical for large, complex multiple-satellite cellular networks because of the computational burden they impose on the network. Greedy algorithms tend to be quite efficient (i.e., minimum Spanning Tree algorithms run in O(e log e).

Graph-theoretic techniques, such as "Clique Packing" can provide close-to-optimal solutions, if traffic is constant or, at least, fully-determinable. However, these techniques are often difficult to scale to real-world traffic conditions, because they are statically predictable, but non-stationary. Also, real-world traffic conditions are not constant. In fact, they are not even temporarily stationary. Allocations using graph theoretic techniques also impose an unacceptably onerous computational burden.

In view of the limitations of the prior art, it is an object of the present invention to provide a channel-frequency allocation system that permits hybrid partitioning of both satellite and link diversity.

It is another object of the invention to optimize the trade-offs related to the conflicting costs and advantages of hard handoffs, diversity, and self-interference.

It is a further object of the invention to optimize satellite-cellular service quality and availability while minimizing reductions in network capacity from misallocated channel frequencies.

Yet another object of the invention is to reduce uncertainty about the usable capacity of an FDMA channel, thereby optimizing spectral efficiency of FDMA/CDMA networks.

It is a further object of the invention to allocate non-contiguous frequencies in hybrid FDMA/CDMA bandwidths for satellite cellular networks while reducing the number of hard handoffs.

It is a further object of this invention to allocate channels in a hybrid/CDMA system so as to efficiently assign gateways and their associated mobile user terminals to channels in a multiple satellite system.

It is another object of the invention to assign channels that are coordinated between gateways.

SUMMARY OF THE INVENTION

A satellite communications system operative with at least one existing terrestrial communication system for carrying traffic is described. The system comprises a plurality of satellites in earth orbits, each of the satellites radiating one or more forward links containing traffic to one or more terrestrial users, each forward link of each of the satellites having a maximum radiation limit and a frequency channel. One or more of the terrestrial users is capable of concurrently receiving at least two of the forward links, the concurrently received two forward links redundantly containing the traffic. The system also has one or more terrestrial gateways, the gateways being bidirectionally linked to one or more satellites of the plurality of satellites for carrying the traffic. The system further includes a computing center, linked to the gateways, having a frequency allocation function for allocating each operating frequency channel to the satellites using the gateways. The frequency allocation function comprises a user model having a frequency re-use pattern; a channel allocation model for modelling the power allocated to each channel; and a gateway channel model for allocating channels in accordance with the user model and the channel allocation model. The allocation is made for each satellite of the plurality of satellites. The traffic allocation assigns an operating frequency for each of the one or more links in each satellite of the plurality of satellites.

BRIEF DESCRIPTION OF THE DRAWINGS

The nature and advantages of the present invention will be better understood when the detailed description of preferred embodiments provided below is considered in conjunction with the drawings provided, wherein:

FIG. 3 is a physical geometry of a satellite antenna having 16 beams, wherein the satellite antenna is suitable for use in the invention;

FIG. 4 is a diagram of overlapping beams from different gateways sharing a single frequency {Labelling code: Gateway, Satellite, Beam {Frequencies}};

FIGS. 8a–8c are diagrams of fluctuations in channel capacity due to path gain;

FIGS. 9a–9c are diagrams of fluctuations in channel capacity due to path gain and self interference;

DETAILED DESCRIPTION OF A PREFERRED EMBODIMENT

Figure 1:
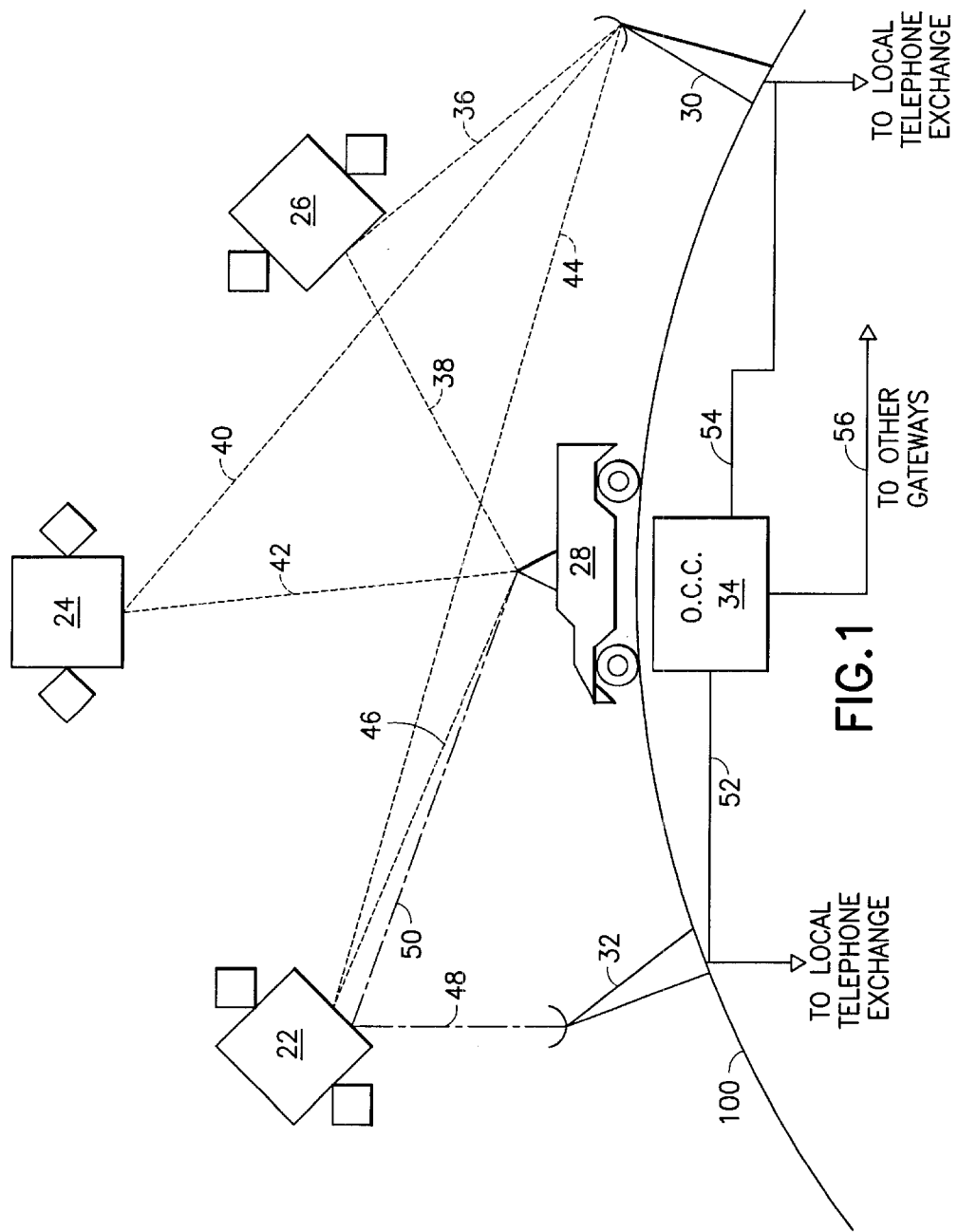
FIG. 1 is a diagram of a satellite communication system where the Channel Frequency Allocation System (CFAS) of this invention operates.

As shown in FIG. 1, frequency allocation and control of an exemplary constellation of satellites 22, 24, and 26 can be achieved by using ground based points, such as gateways 30 and 32 located on terrestrial surface 100. Gateways 30 and 32 have a list of channel allocations for each satellite 22, 24, 26 available to a particular gateway, as a function of time, for linking to a mobile user 28. Also, each gateway 30 and 32 can allocate traffic to each channel in the list. It is understood that mobile user 28 can also be a concentrator where traffic from multiple users is collected for transmission to/from satellites 22, 24 and/or 26. Generally, gateways 30 and 32 are connected to the public telephone network, perhaps directly to the local telephone exchange. The public telephone network can be viewed, in general, as a traffic concentrator for routing traffic to satellites 22, 24 and/or 26 via the gateways 30 and/or 32.

Operation control center (OCC) 34 provides traffic allocation updates for each satellite to the gateways 30 and 32 via links 52 and 54. Links 52 and 54 can be implemented using, for example, terrestrial-based connections, cellular links, satellite links, or some other suitable linking mechanism. Link 56 connects the OCC 34 to other gateways, thereby enabling the OCC 34 to collect and distribute information required by each gateway for its traffic allocation. In accordance with this invention, the OCC 34 is a central computing point which can determine traffic allocations for each satellite. The OCC 34 can control the gateways 30 and 32 to provide communications to the respective satellites in accordance with the traffic allocation determinations of the OCC 34, so as to implement these traffic allocations.

The OCC 34 can optimize traffic allocation by choosing which satellite 22, 24 or 26 is to carry traffic passing through each gateway 30 and 32, destined for user 28. For example, the user 28 can be served by gateway 30 using one of three possible transmission paths. First, gateway 30 can use satellite 26 to reach user 28 via links 36 and 38. Second, the same gateway 30 can reach user 28 by using satellite 24 using links 40 and 42. Third, gateway 30 can use satellite 22 to reach user 28 using links 44 and 46.

As the satellites 22, 24, 26 move in their orbits, it may become necessary to re-allocate the path of traffic provided between the gateway 30 and the user 28. For example, it is assumed that communications are being provided between the gateway 30 and the user 28 via the satellite 22. It is also assumed that the satellite 22 is low on the horizon with respect to gateway 30 and/or has a low state of charge (SOC). If the orbital path of satellite 22 takes it further lower on the horizon with respect to gateway 30, transmission and reception power requirements may soon exceed allowable power limits. In this case, traffic to/from user 28 can be shifted from satellite 22 to a better situated satellite with a better state of charge (SOC), such as satellite 24 or satellite 26. In the alternative, if no adequate substitutes for satellite 22 can be linked by gateway 30, the traffic to/from user 28 may be re-routed to gateway 32 for operation in conjunction with links 48 and 50. This re-routing of traffic from gateway 30 to gateway 32 is directed by messages from, and in conjunction with computations made by, the operations control center (OCC) 34. For diversity, user 28 can be serviced using, for example, satellites 24 and 26 concurrently. In this case, user 28 links with the gateway 30 through links 40 and 42 using satellite 24, and through links 36 and 38 using satellite 26. These links carry information to/from user 28 redundantly, thereby increasing the quality of the communication provided. The OCC 34 coordinates traffic to the user 28, and associated handoffs, using link 54 to gateway 30, link 52 to gateway 32, and link 56 to other gateways.

Information that is input to the OCC 34 includes the expected traffic by geographic area, i.e., grid points, and channel. A set of instantaneous constraints and satellite operational policy is also input to the OCC 34. Information that is output from the OCC 34 to the gateways 30 and 32 includes a power and channel allocation over time in the future.

Typically, the OCC 34 provides services for a plurality of service areas comprising a plurality of users, similar to exemplary user 28. Service areas, in general, are geographic locations operated by a single entity.

It should be noted that the Channel Frequency Allocation System (CFAS) of this invention is not limited to operation in OCC 34. For example, the invention can be used locally, for example by the gateway 30 and 32. As part of the software residing at gateway 30, the CFAS would receive actual traffic service requests, and make decisions on diversity paths, channel allocation, and power usage for traffic passing through the respective gateway. This localized optimization approach is generally not applicable in the case where multiple gateways can address a plurality of satellites in multiple areas. Since the satellites may be typical "bent pipes" (i.e., the satellites can re-transmit received signals), a plurality of gateways accessing the same satellite would have to coordinate their traffic, channel, and power allocation for proper control. Because of this, in general, a satellite-cellular network in accordance with the present invention has at least one central Operational Control Center (OCC) 34. OCC 34 is a central control location for the network that provides to the gateways n each region traffic-volume predictions, satellite power-demand limits, and satellite-tracking schedules for all satellites (e.g., 48 satellites). The allocation system of OCC 34 provides a bi-weekly channel allocation plan to the gateways.

In accordance with a presently-preferred embodiment of the invention, a world-wide OCC 34 is associated with one Satellite Operational Control Center (SOCC). The SOCC provides telemetry indicating each satellite battery's state-of-charge (SOC), and other operational conditions (e.g., transponder traffic and SNIR values) detected on-board the satellites which are visible to the gateways reporting to the SOCC. The satellites are distributed in a "Walker" constellation having eight orbital planes with six equally-spaced satellites in each plane. The orbital planes are inclined 52 degrees from the equator and each orbital period is 114 minutes. Two satellites are always simultaneously in view of each user, for users that are located on the earth between 70-degree north and south latitudes.

Preferably, OCC 34 provides minute-by-minute channel allocation plans for all service areas, worldwide, for example, every two weeks. Unlike many prior art satellite cellular systems, each geographic service area can be defined for regulatory and administrative convenience, not dictated by a rigid tiling geometry.

To improve the spectrum-usage efficiency of the multiple-satellite network, its channel allocation system considers the capacity effects of satellite orbital dynamics, particularly the effect on self-interference, as well as satellite power resources.

Frequency-assignment Alternatives

There is a trade-off between sharing channel frequencies among gateways and completely partitioning the channels by assigning them to separate gateways. Eliminating co-channel, gateway-to-gateway interference by completely partitioning the frequencies used by the gateways permits additional circuits to use each channel frequency.

Likewise, separate channels can be allocated to adjacent beams to minimize the effects of beam-to-beam interference on network capacity. However, partitioning channels in this way may increase the number of potentially disruptive hard handoffs. Channel-frequency changes occurring while a call is in progress are minimized to protect the quality of the service. The goal of minimizing the number of pilot signals consuming satellite battery power is balanced with the goal of minimizing the call-disruptions caused by hard handoffs.

Therefore, multiple-satellite networks of this invention have a channel allocation within their particular, limited spectrum bandwidths that maximizes network capacity, while also protecting the quality of user terminal circuits. Time-varying channel allocations are made to take into consideration anticipated user traffic scheduling, as well as the geometry of the service area and the illumination of these areas by satellite beams. In general, the satellites operating in each service area are controlled and monitored by the area's respective gateway, using frequencies above 3 GHz for both forward and reverse FDMA/CDMA telemetry and command links. Preferably diversity combining rake receivers are used, and the receiver demodulates Walsh-code signals using a suitable method such as the Fast Hadamard Transform (FHT). Typical feeder link operation is in the C-band. Higher, Ka-band or Ku-band frequencies could also be used for administrative links. The presently preferred CDMA encoding technique is similar to the TIA/EIA Interim Standard "Mobile Station-Base Station Compatibility Standard for Dual-Mode Wideband Spread Spectrum Cellular System" TIA/EIA/IS-95, July 1993. Other CDMA techniques can be employed.

Figure 2:
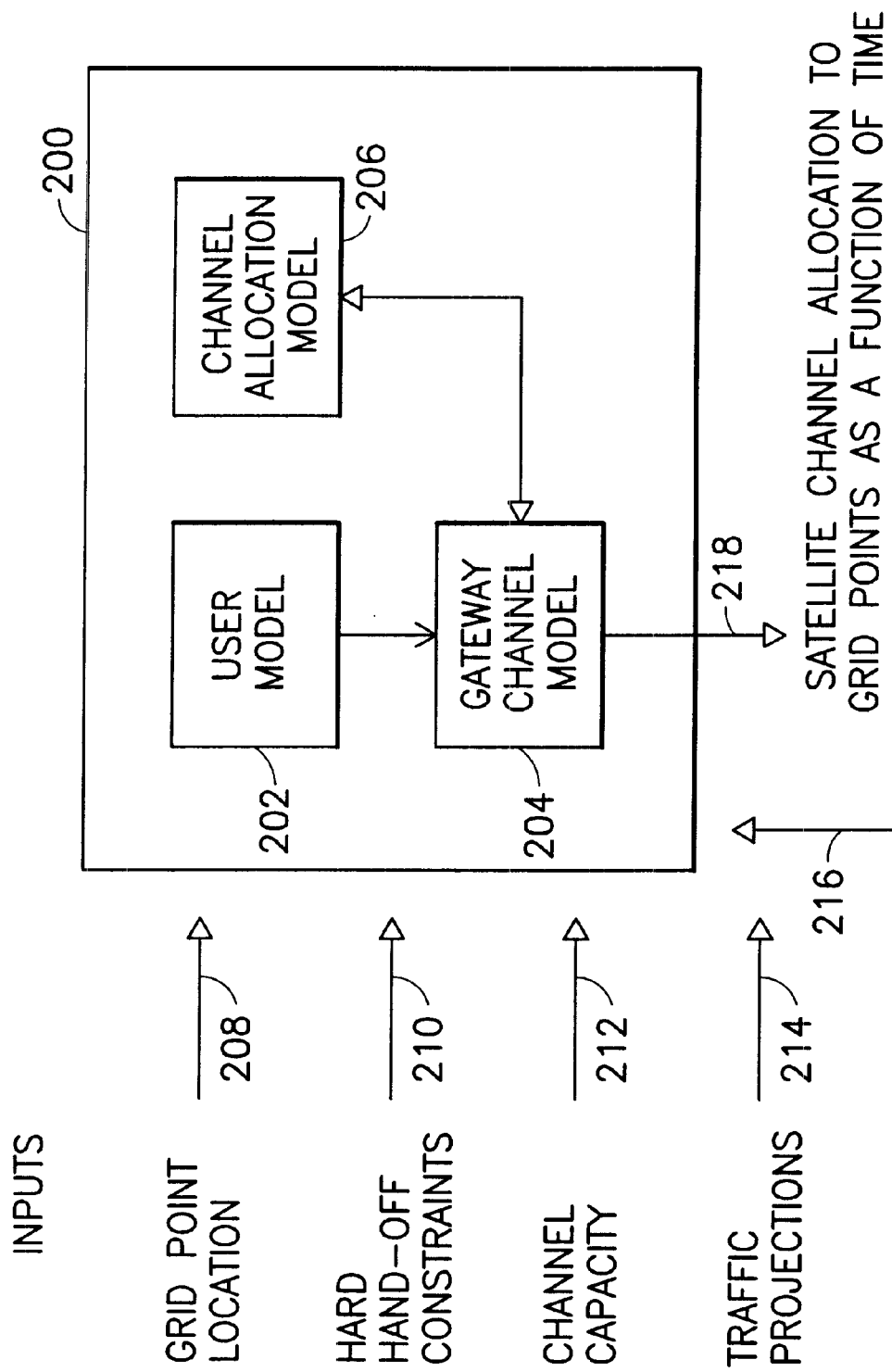
FIG. 2 is a block diagram of the Channel Frequency Allocation System (CFAS) of this invention.

Channel allocations for user traffic on the network are determined by OCC 34 of the satellite-cellular network shown in FIG. 1 using the Channel Allocation System shown in FIG. 2. In accordance with FIG. 2, the Channel Frequency Allocation System (CFAS) 200 has a user model 202, a channel allocation model 206, and a gateway model 204. The output 218 from CFAS 200 is a satellite channel allocation to grid points as a function of time for all satellites currently linked to one or more gateways, such as gateway 32.

One input to CFAS 200 are the grid point locations 208 defining the location of various grid points to be served. Another input to CFAS 200 are hard hand-off constraints 210 dictated by quality of service considerations.

Another input into CFAS 200, is channel capacity 212. This input defines channel capacity for each of the channels to be allocated by CFAS 200.

A forecast of communications traffic, traffic projection 214, is also input into CFAS 200. This forecast over the simulation interval may be derived from historical records of a service provider for each service area.

Future Orbital geometry data 216, again projected over the length of the simulation interval, is also input. This data is expected to be relatively constant, and requires updating only when the satellite is repositioned in its orbit. Combining the future orbital geometry data 216 with the traffic projection 214 allows the computation of link loss load for each particular satellite over its orbit associated with each grid point.

CFAS 200 is implemented as a software process on a digital computer having a graphical display console. The software is designed to be modular, wherein user model 202, channel allocation model 206, and gateway model 204 are, optionally, run independently. A multiprocessor system wherein each of these models are run independently is envisioned with data being exchanged between the three modules 202, 204 and 206 at the end of each simulation time interval or other convenient time. Since each model can be run on a separate processor, parallel processing is achieved, speeding up each of such separable operations for timely results.

CFAS 200 may display the channel allocation 218 for each desired time increment to human operators for real-time confirmation while it also generates channel allocation instructions to gateways under its control, such as gateways 30 and 32.

CFAS 200 runs typically at a central location, such as the OCC 34. The inputs to CFAS 200, such as 208, 210, 212, 214 and 216, need to be updated to insure that CFAS-assigned future values are accurate, i.e., representative of actual conditions during the calculation interval. Any substantial departures in the simulated parameters from actual values experienced in the satellite network, as derived from actual, (now historical) satellite telemetry data, can be used to refine the projection mechanism for each individual input. Typically it is user traffic projections 214 that need to be updated and refined relatively frequently due to the changing nature of this input. Depending on traffic changes, and quality of traffic projections 214, these update periods may be quite long, reducing the need for immediate communication between OCC 34 and the plurality of gateways, such as 30 and 32. It is also noted that traffic projections 214 (a variable with a high rate of change that may need to be updated frequently) can be transmitted directly from a service provider associated with user 28 by a gateway currently serving user 28, such as 32, and forwarded to the OCC 34 via link 52 in timely fashion for updating CFAS 200 calculation.

Operation

As shown in FIG. 2, CFAS 200 contains three processing modules, a user model 202, a channel allocation model 206, and a gateway channel model 204. Preferably channel allocation model 206 comprises a traffic allocation module having a node-tiling section, a node-adjustment section, and a diversity implementation module. A pseudo-code listing of subroutine 'zassigntv.m', used by the respective modules is provided in the Appendix, below.

These component modules are implemented as software executed by a digital computer in the OCC 34 or the Ground Operational Control Center (GOCC). The digital computer is preferably a multiprocessing digital computer system, to take full advantage of the improved computational performance provided by the decoupling implemented in these component modules and between them and the network's battery-power and link-power allocations in accordance with the present invention.

A diversity policy for the gateway's service area and a matrix limiting links-per-channel for each satellite are separately determined, and input to the channel allocation system. Within the channel allocation system, dynamically-defined node-area sizes are input from the user-traffic module to the module implementing a desired diversity policy.

In accordance with the present invention, the areas covered by each node are not defined by the power of a pilot-frequency signal, or by a fixed "tiling" of the geographic area. Instead, the nodes have "virtual" coverage areas that are defined at a given moment about a fixed geographic point or "node" within the respective geographic service area, for optimum satellite-cellular service.

Call circuits are assigned by each gateway on demand, in response to calls initiated by user terminals in its geographical area. The location of each user terminal determines its service area and the gateway serving that area. For each such user-terminal location there is a suitable "main beam" in a satellite footprint, the nearest beam of the satellite having the highest elevation.

A bandwidth of 16.5 MHz is used for the 13 channels of the forward link, and the 128 possible Walsh code spread-spectrum (SS) links are used in each channel. Channels for a given service area could be allocated by simply distributing the available channel frequencies to uniform-size tiles throughout the service area. Advantageously, the tiling pattern is set up for the gateway by assigning channel frequencies to geographically variable areas assigned according to predicted traffic-density.

For diversity implementation, the node definition of the channel assignment within each satellite beam is modified such that the maximum number of links assigned within the area covered by each beam is less than GS*C, which is the product of the number of channel frequencies in each beam "C" and the particular gateway's satellite-diversity level defined by "GS" (which is the number of satellites permitted to share a frequency).

This also affects the reuse distance for channels that are used for satellite diversity. For example, for the reuse of channel #1 that is used by two overlapping satellite beams, the channel-reuse distance is generally not less than two beam-widths. As can be understood from the geometry, overlapping beams are more than on beam-width away from the other beams carrying that channel, else their combined beam-width could overlap, creating interference. However, so long as satellite diversity is not provided in the service area, one beamwidth provides adequate separation. As shown in FIG. 4, beams may be partly overlapping, for example with respect to channel 1.

Call-arrival statistics designating user terminal type and caller location within the service area are supplied to the gateway by user terminals as part of a transmission requesting a call circuit. The gateway forwards this data to, for example, OCC 34 and assigns each such call to one of several nearby nodes, depending on traffic density and distribution in the service area. For example, during a busy hour, calls that originate in an area closest to a first node may be assigned to a next-nearest node, to off-load traffic from a node that is becoming overloaded.

Power Optimization

The OCC 34 computations of CFAS 200 separately determines a battery discharge control plan for the given two-week period. This battery-discharge control plan calculates a channel power allocation that optimizes a given channel performance objective. Preferably, the objective is to maximize channel capacity for a given channel-sharing policy, with the requirement that signal power be balanced across channels and over time. Satellite battery-power optimization determines respective channel-priority weightings for a given diversity policy, thereby providing a schedule of channel priorities over time. For the following calculations, table 1 details the notation convention. This convention is to use subscripts to indicate system component indices and superscripts as further description of the term. Lower case letters are indices. Upper case letters represent the maximum value of those indices.

TABLE 1 terminology for the link model

| TERM | DESCRIPTION | UNITS |
|---|---|---|
| $G_g^t$ | The gateway transmitting antenna gain. | ratios |
| $G_s^r$ | The C-band satellite receiving antenna gain. | ratios |
| $L_{g,s}^u$ | The uplink free space loss which is a function of the elevation angle from gateway-g to satellite-s. | ratios |
| $L_{misc}^u$ | The uplink miscellaneous loss, a fixed constant. | ratios |
| k | Boltzman constant. | W/K-hz |
| $T_{ueff}$ | Effective uplink noise temperature at the input port of a satellite. | deg-K |
| $B_T$ | Total satellite transponder bandwidth. | MHz |
| $G_s^a$ | The transponder amplifier gain is generated at the output of the transponder. | ratios |
| $S_{s,b}$ | Power for a satellite beam. | W |
| $p^{i\,mod}$ | Intermodulation caused by the amplifiers non linearity. | W |
| $G_k^r$ | The user's receiving antenna gain at a grid point; a function of elevation angle. | ratios |
| $\eta_o^U$ | is the uplink thermal noise power spectral density | W/Hz |
| $G_{s,b}^t$ | average satellite transmitting antenna gain | ratios |
| $L_{sb,k}^d$ | Downlink free space loss from satellite-s to gridpoint-k, this depends on the elevation angle of the k-gridpoint to the beam-b of the satellite-s. | ratios |
| $L_{misc}^d$ | Miscellaneous downlink loss | ratios |
| $\eta_o^d$ | the Downlink thermal noise power spectral density | W/hz |
| SNIR | user's signal energy per data bit divided by the total noise power density | ratios |
| N | total noise power density | W/hz |
| w (k, c, t) | channel priority weights | ratio |
| $\alpha_{gsb,k}$ | path gain matrix | ratio |
| $x_{gs,cb,}$ | power sent by a gateway, in a channel, on a satellite, in a beam for a grid point | watts |
| $S_{gs,cb,}$ | power received by a gid point from a gateway, on a satellite, in a beam, in a channel | watts |
| $c_{gscb,i}$ | number of users at a grid point on a channel | circuits |

The requirement that signal power be balanced at any given point in time is a maximum channel power limit expressed as a minimum-power, "power point" objective:

$$\min (x) \sum_{C=1}^{c} w_c \cdot x_c$$

This states the efficiency objective of minimizing total channel power for all "$x_c$", which is the variable representing the signal power of a channel "C" received at a satellite, summed over all gateways, beams and satellites in the area of interest. This efficiency objective is achieved when the variables are properly weighted.

The objective stated above is achieved at the moment when weighing factors "$w_c$" for all gateways, beams and satellites in the area of interest are one. This means that power is equal across these channels, which, in an FDMA/CDMA satellite-cellular network means that self-interference is minimized so that minimum power is expended. Over time, the balanced, minimum-power objective is:

$$\min_{(t)} \sum_{t=1}^{T} x_c^T \cdot Q \cdot x_c$$

where the Q is a positive, definite matrix that weights the product of initial and ending satellite channel power values "x".

Traffic Allocation

The traffic allocation module ensures that the same channel is available at a given traffic node from the satellites selected for satellite diversity. In the "diversity link" SNIR equation, the sum of signals divided by the sum of noises. Thus interference affecting only one of the satellites can be corrected by the signal received from the other satellite.

In accordance with the present invention, the diversity implementation module selects the two highest elevation satellites, just as the diversity power algorithm does. Other selection criteria such as best path gain could, alternately, be employed as the selection criteria however. A beam on each of those satellites then uses the same channel for the appropriate traffic node.

The pilot-signal power required by a particular satellite beam depends on its location within the satellite footprint: inner, middle and outer. The satellite-cellular network use two kinds of pilot signals:

beacon signals: one per beam*gateway reference signals: one per beam*channel*gateway.

The beacons are used for "cold" acquisition of new links, and their power and number/satellite are modeled as a constant, unlike the pseudo-noise (PN) CDMA signals. The channel-diversity model permits a different SNIR threshold to be specified for each type of pilot.

User-Traffic Model 202

The user traffic dynamics are used in the hard-handoff part of the barrier function calculation. User traffic dynamics describes the new calls and held calls over time.

The "virtual" node areas provided by the user-traffic model 202 compensate for channel-power fluctuations. Changes in user-traffic volume cause additional power fluctuations over time.

The user-traffic module contains a geometric device useful for establishing hybrid diversity strategies. Channels can be dedicated to a single gateway by setting a minimum physical distance for frequency reuse that bars its use by neighboring gateways, guaranteeing implementation of the CP strategy and no gateway-to-gateway interference. Relaxation of the complete-partitioning policy, still assures minimum gateway-to-gateway interference by maintaining that minimum distance between reused frequencies.

Figure 6:
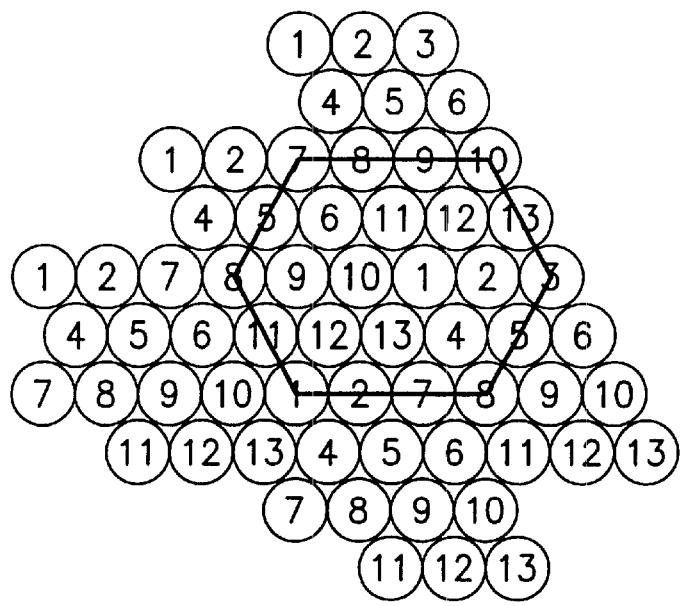
FIG. 6 is a cellular reuse pattern for maximizing channel reuse patterns.

FIG. 6 shows a fixed-grid "tiling" of satellite-cellular traffic nodes for the 13 frequencies available in a given satellite beam, indicated here by a hexagon. Each tile represents a node that is assigned a channel frequency and a given number of user-terminal links. Each number in FIG. 6 identifies the particular channel frequency used by each tile. The tiles are laid out so as to maximize the distance between tiles where a given frequency is reused. For maximum network capacity, the tiling pattern should be such that this maximum separation between reused channels is maintained as the beams move across the earth's surface.

Some nodes may be covered by more than one beam, but only partially covered by a particular beam. If there are fewer than 13 cells within the beam's coverage area at any one time, then the beam has excess channel capacity and more users can be added. If the beam's coverage area includes more than 13 such cells at any one time, then there is excessive traffic for coverage by that one satellite.

Figure 7:
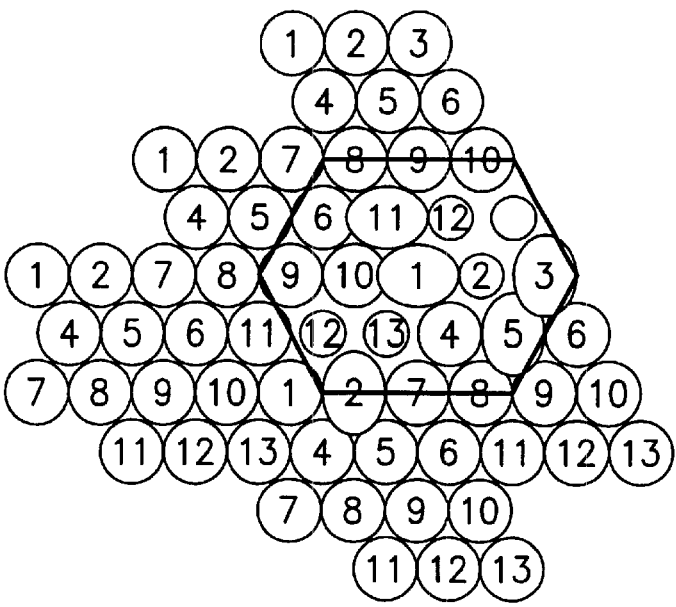
FIG. 7 is a variably-sized node-tiling diagram showing compensation for local differences in link demand and links/channel limited to reduce the beam-to-beam SNIR, in accordance with the present invention.
Figure 10:
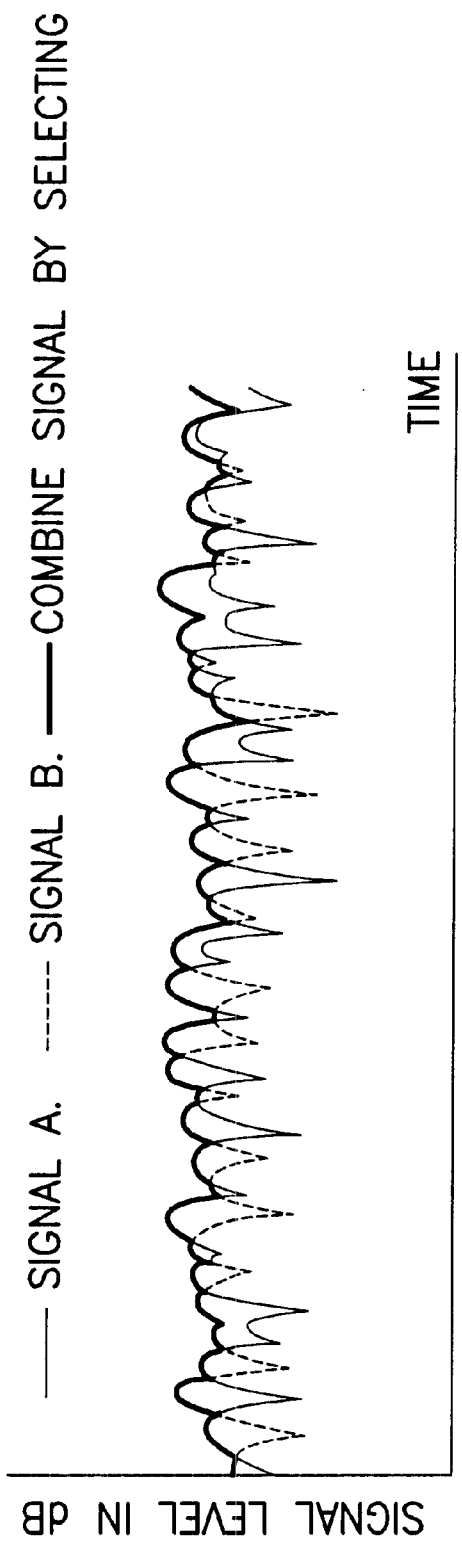
FIG. 10 is a diagram of the smoothing of channel capacity resulting from a satellite diversity strategy.

In FIG. 7, the channel assignment used in FIG. 6 is modified in accordance with the present invention so that the signal-to-noise interference ratio (SNIR) is balanced among users being served, to optimize cellular service for all users. The tiles labelled #2, #12 and #13 (frequencies that appear more than once) are made smaller so as to serve fewer users and carry less power. This minimizes the self interference caused by frequency reuse. Similarly, the area of neighboring cells labelled #1, #3, #4 and #5 are made larger, because those frequencies can carry more power without increasing self-interference (since those frequencies are not being reused within the beam).

The user traffic dynamics is used in the hard-handoff part of the barrier function calculation. The user traffic dynamics describe the new calls and calls held over time. The change in number of calls at any point in time is given by the change in new calls and held calls:

$$\Delta C_m(k, t_1) = C_m(k, t_1) - C_m(k, t_2) = \frac{1}{\tau}(C_m^{nc} - C_m^{hc})$$

where τ is the average holding time of a user call. User-traffic patterns also indicate the incidence of hard-handoffs, in conjunction with the incidence of new calls and held calls over time.

The number of hard handoffs occurring in the system is indicated by the difference in channel allocations and the change in calls provided:

$$hh(k, t) = \sum_{c=1}^{C} \Delta C_m(k, c) = \Delta C_m^{nc}$$

The user model 202 also contains a geometric interpretation that is useful for the Completely Partitioned strategy and part of the Complete Sharing Strategy. Channels are dedicated to a single gateway by a physical distance for frequency re-use. A frequency reuse pattern guarantees the Channel partitioning. The CP strategy also assures no gateway to gateway interference by maximizing the distance between reused frequencies.

It has been found that an optimum allocation occurs when 13 cells, each using a separate channel, appear within one beam, as shown in FIGS. 6 and 7. This allocation gives each user an assigned frequency. For maximum capacity, the 13 cell cellular pattern in this invention is chosen so that any position of the beam results in an optimum set of cell allocations. In FIG. 7, the cell size for each of the 13 components is changed to balance the signal to noise interference ratio for all users.

It had been hoped that diversity, using more than one signal source at a time, might help smooth signal-power/network capacity fluctuations over time, as it does in ground-cellular networks. The effect of diversity on such slow fluctuations in the received power of a satellite signal was tested for channel allocations using an optimally-weighted power allocation.

However, this test showed that, to the contrary, link diversity did not smooth the satellite's signal power. Moreover, a link-diversity strategy makes the harmful effects of those fluctuations even more serious, because it increases satellite-to-satellite self-interference that causes signal-quality degradation. Thus, feasible satellite-cellular channel allocations can suddenly become infeasible within a few minutes' time, and diversity strategies are ineffective.

Channel Allocation

As part of CFAS 200, as shown in FIG. 2, is channel allocation model 206. Channel allocation model 206 calculates the channel performance objective. The channel allocation inputs a channel policy, a set of channel capacities, and processes these inputs over time to determine a channel priority weighing. The output is the channel priority over time.

Performance Objective

As part of channel allocation model 206, a performance objective function is used to maximize channel capacity subject to the constraint of no hard hand-offs for calls in progress. A hard handoff is a change in frequency for a call in progress. New calls can be placed on any channel without impact on call quality. A hard-handoff may reduce quality by inducing unwelcome extraneous noises in the communication link or dropping the call completely.

Within channel allocation model 206, a performance objective is optimized. The performance objective is calculated as a barrier function which penalizes decisions to use channels which force excessive circuit re-arrangement, i.e. hard handoffs. The barrier function is defined by these steps:

a) subtract the limit on number of acceptable hard hand-offs for existing (held) calls=0 from state variable hh(t). The state variable hh(t) is the difference between the number of required hard hand-offs and the number of new calls for each channel c, at each grid point k. The penalty from hh(t) is reduced for future times as the allocation of calls is less certain. The barrier function then is:

$$\forall c, k$$
$$\forall t \in [t_o \ldots t_f]$$
$$w(k, c, t) = e^{(-t\lambda)} \ln\left(\frac{1}{hh(t)}\right)$$

where t—is "simulation time", in seconds, of the particular computations that have elapsed since time zero (which is typically the start time of the current simulation);

λ—is a time constant associated with the duration of traffic changes, and/or the duration of one orbit, and may be, for example, about 100 minutes. This can be adjusted for different values depending on traffic conditions, and accuracy of traffic predictions.

The result is then converted to a number between 1 and 10.

Channel Policy Input

Another component in channel allocation model 206 is the input that describes channel sharing policy. The complete sharing policy (CS) provides best system capacity. Complete partitioning (CP) provides for dedicated usage for certain applications such as emergencies. A hybrid policy allows CS and CP to exist among the channels of a service area.

The applicable terminology and assumptions used in channel allocation are:

a) Control is any change that affects the system in time to respond to disturbances;
b) Channel allocation is a plan which provides instructions for gateways;
c) Channel is a frequency band (i.e. 1.25 Mhz) provided by satellites;
d) A connection is an end to end user call;
e) Circuits are individual user traffic allocations (i.e. Walsh codes);
f) Control policy is a strategy for maximally utilizing the system;
g) Control mechanism is the realization of a control policy in hardware/software;
h) Grid points are terrestrial traffic concentration nodes; and
i) Diversity combining on the forward link means information is redundantly transmitted from more than one satellite to a grid point or user for a single connection.

Operation of the system assumes the following:

1) Dual order diversity for each grid point is required;
2) Diversity uses the same frequency;
3) Regions of the world are subdivided into service areas;
4) Service areas cannot cross region boundaries;
5) Service areas are non-overlapping;
6) A gateway supports one service area;
7) A grid point is serviced by only one gateway;
8) Service areas are connected areas;
9) The channel allocation of the forward downlink is considered;
10) The whole world can be considered on a case by case basis; and
11) All satellites and all beams are considered.

Note that the case of a service provider controlling multiple gateways is not precluded. Such a service provider would simply control multiple service areas.

The critical dimensions of a satellite antenna are important to channel allocation. For example, as shown in FIG. 3, an antenna for use with this invention has the following characteristics:

Number of beams on a satellite: 16;
Orbit elevation: 1414 km; and
Look angles: 10, 44.1, 67.8 degrees.

Each satellite beam contains all 13 channels. Two gateways cannot be assigned to the same beam in the same satellite within the same channel. There are 119 traffic circuits within a channel. A pilot circuit is used to inform a user terminal of the gateway's existence. The pilot signals only need to be sent on allocated channels and beams for the gateway of that service area.

Beam handoffs occur independently for the reverse link and the forward link whenever a pre-established threshold in signal to noise ratio is reached. The hand-off can be to the same circuit, a different circuit in the same channel (soft handoffs) or to another channel (directed handoff). Satellite handoffs occur simultaneously for the forward and reverse channels (hard handoffs). This type of handoff occurs whenever the last beam has moved out of line of sight. The handoff can be either soft or directed as between beams.

As discussed supra, potential channel allocation control policies are Complete partitioning (CP), Complete sharing (CS), and Hybrid policies (HP). These are described as follows.

Complete partitioning (CP)—specifies dedicated channels when the beam is over a service area. Thus each user call will use only resources allocated to that service area. When all resources are used, other incoming calls from that service area will be dropped.

Complete sharing (CS)—specifies that any call from a service area can be processed by any of the unused channels in that service area as long as the channels are available (e.g. random access techniques can be applied to allocate shared channels).

Hybrid policies (HP)—specifies that a user call from a service area can be assigned to channels up to a specific threshold, where the sum of the thresholds may be greater than the overall number of channels.

As a consequence of the above, in the CP control policy, the beam size is critical to the reuse of frequencies. When a beam covers a boundary between multiple service areas, only one of those service areas can use any particular channel. The larger the beams are in comparison to service area size, the greater the difficulty. For the CP policy, channel reuse as measured by the distance between beam locations carrying the same frequencies, has to be considered, as, generally, the minimum distance allowed for dual diversity is 2 beam widths. For 3 path diversity, the minimum distance is 3 beam widths. This is a result of a channel of one satellite beam overlapping with the same channel on another satellite beam.

In a completely shared control policy, different satellites with different beams can use the same frequencies. As illustrated in FIG. 4, a grid point A receives signals from different satellites on the same and different frequencies.

Figure 5:
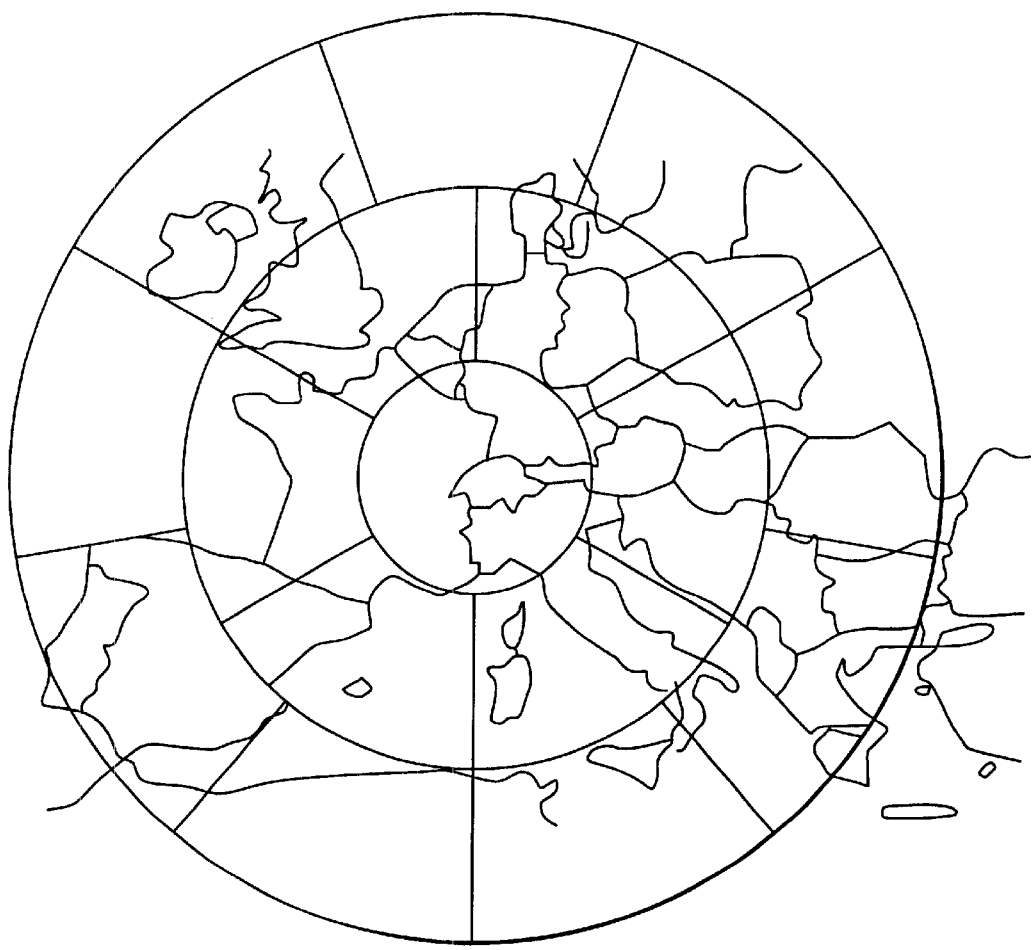
FIG. 5 is a diagram of the coverage of the satellite antenna of FIG. 3 over Europe.

A hybrid policy can be applied for channel usage. For example, in Europe some service areas might include more than one country. Each country may desire dedicated channels. The satellite beam footprint is larger than some countries, hence encompassing many service areas, even in the same beam. This is illustrated in FIG. 5. Calls are generated on demand by user terminals in a geographic area. Call arrival may not be constant. Calls may originate from different types of terminals such as mobile, handheld, and fixed. Each of the terminal types have different characteristics. Link signal to noise ratios and diversity strategies are different for each type of terminal. The location of the user terminal determines the service area and the gateway used. The specific location is in a unique beam of a particular satellite servicing the area. Channels are preferably one frequency. Circuits within each channel are numerous Walsh codes. There are 13 channels in the forward link, and 9 channels in the return link. Each user channel assignment is independent for the forward and reverse link.

Channel Capacity Input 212

Another input for CFAS 200 is channel capacity 212. This is a "smoothed" value of channel capacity and constant self interference power for improving estimates of the number of circuits supported in a channel. The capacity of the channel varies with time in a multiple satellite system because the number of circuits that can be supported in a channel depends on the amount of signal power and noise present at the user terminal. This channel capacity fluctuation is illustrated in FIGS. 8a–8c for one gateway, one satellite, two beams, and two grid points. The amount of energy per bit received at each grid point has large fluctuations as well as total satellite power required to service one grid point with one circuit. As a consequence, the number of circuits supported over time varies by orders of magnitude. In the case shown on FIGS. 8a–8c, the fluctuation is solely due changes in path gain from the gateway to the satellite and to the grid point. There is no self interference.

FIGS. 9a–9c illustrate the effects of self interference on channel capacity. Here the configuration is two gateway service areas, two satellites, one channel, two beams per satellite, and 8 grid points, with 4 grid points per service area. The interference introduced is from three sources: multiple satellites, multiple beams, and multiple gateways. FIG. 9 shows that the change in energy bit is less than that due to path gain, but is still substantial.

The capacity allocation uses a given smoothed value of capacity per channel. This reduction in variability is due to 2 path and 3 path diversity advantages. Diversity reduces the effect of path loss to any particular satellite. FIGS. 8a–8c show this smoothing effect due to diversity.

Hence, channel capacity 212 makes these assumptions about channel capacity:
a) Capacity is nearly constant over time for a channel in the case where diversity is employed; and
b) Self interference can be considered constant for all users in a channel since self interference has lesser influence than path gain variations.

Dynamic Channel Allocation 206

In the dynamic channel allocation model 206 channels are allocated by translating channel allocations at ground based grid points to satellite beam assignments. The translation from ground based channels to space based channels is performed by separate power allocation device.

Channel allocation dynamics is concerned with minimizing the number of lost calls and interrupted calls over time. A call attempt may be lost or interrupted due to insufficient power or channel resources. A circuit is considered to be one call which can consume multiple satellite resources due to diversity.

When a new call is attempted in a certain cell, one of the frequency circuits (Walsh codes) is assigned to it.

If all the circuits assigned to this channel and all other channels are in use, the call is blocked.

Conversely, after a call is established to a mobile subscriber, for example, the subscriber may cross into a new beam boundary or be directed to use another satellite while the call is in progress. In this case the call is handed off either via a soft hand-off which involves only a code change, or via a hard hand-off which changes the channel frequency. In the event that no circuit is available at the time of a hard hand-off, the call is dropped by necessity.

Figure 11A:
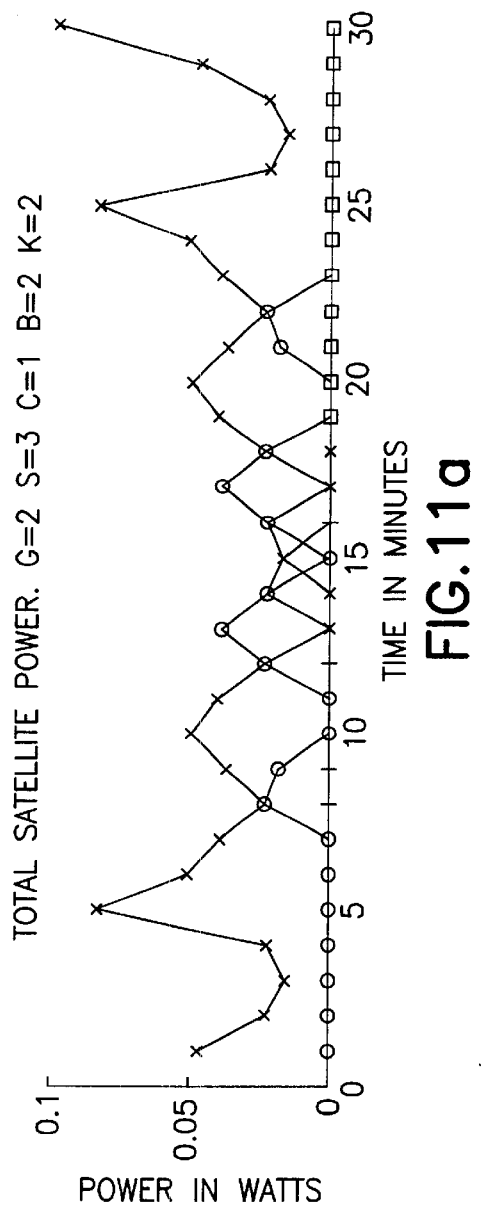
FIGS. 11a–11c show diagrams of how two gateways cooperate over time in servicing channels, where there are two gateways, three satellites, a single channel, two beams and two grid points.
Figure 11B:
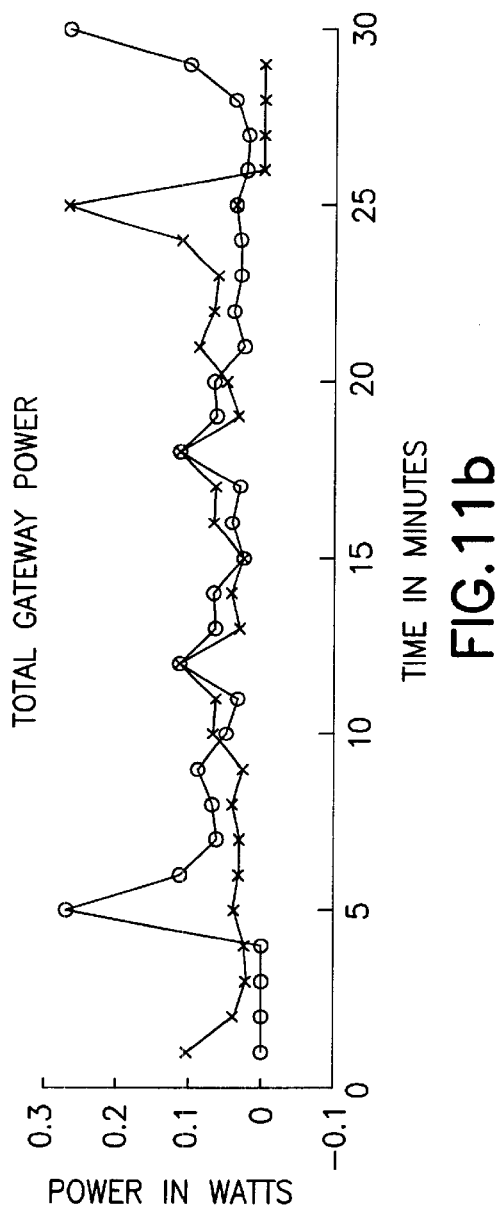
Figure 11C:
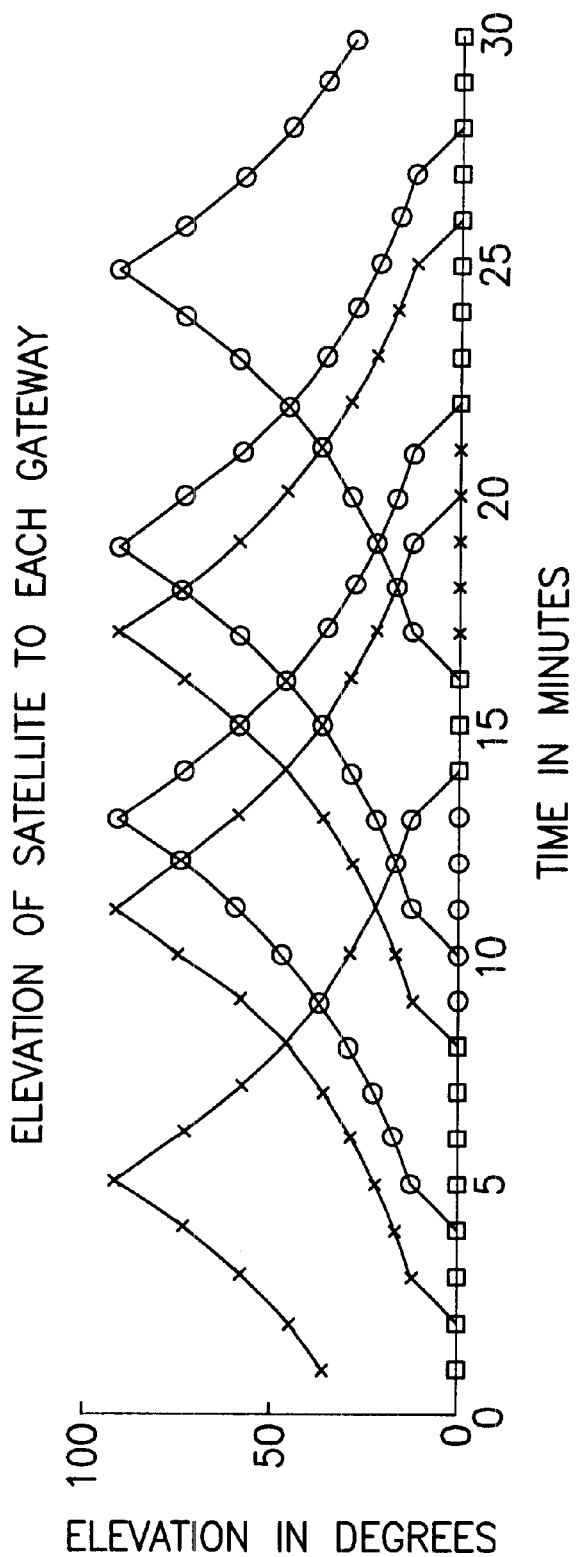

The dynamic channel allocation model 206 models the change in the power allocated to each channel, in each beam by each gateway. Channel allocation model 206 translates channels allocated to grid points to the appropriate channels on the satellite. As each grid point leaves the beam, the channel power in that beam undergoes a power decrease. Concurrently, the channel power in the next beam location increases. FIGS. 11a–11c illustrate that the channel power for a grid point, as it transitions from beam to beam, is trapezoidal.

The channel allocation steps are:
1) Start with a constant channel weighing factor, given circuit demand and time interval (e.g. one day). Start with a nominal channel distribution of channels to grid points.
2) Determine the optimum static power allocation using the static model. (Pass1)
3) Optimize channel distribution using self interference terms for each grid point at each time step.
4) Compute the barrier function and determine channel weighing values for each time step.
5) Use the weighing values to satisfy the hard-handoff constraints. (Pass2). Rerun the static optimization of channel distribution.
6) Stop—with channels at grid points allocated over time.

Gateway Channel Model 204

The channel model determines the distribution of channels to each grid point which minimizes system power at each point in time. The channel model uses a Linear programming formulation to compute the instantaneous best channel allocation. The constraints are on instantaneous power limits and link closure. The model input is the total desired number of circuits for each grid point, and the self interference.

The performance function to be minimized is given by the summations to provide total satellite power.

$$\sum_{s=1}^{S}\sum_{g=1}^{G}\sum_{c=1}^{C}\sum_{b=1}^{B} G_{sr} \cdot G_{st} \frac{x_{gs,cb}}{L_{ufsl} \cdot L_{umisc}}$$

This is the supply of user circuits, represented thusly:

$$\forall k, t$$

$$\sum_{c=1}^{C} w(k, c, t) C_m(k, c) = c_k$$

This equation describes how the sum of the users on a channel at a traffic concentrator adds up to the total number of user circuits at the traffic concentrator. It constrains the channel allocation to provide a channel for all user allocated power.

The channel allocation static constraint insures that a channel is available for every user with allocated power. The channels of a number of user circuits are translated to channels on the satellite using the following equation:

$$\forall c, \sum_{k=1}^{k=K} C_m(k, c) = C_{gscb}$$

where $C_{gscb}$ is the number of users in a satellite beam and a channel from a gateway, and $C_m(k,c)$ is the number of users at a grid point in a channel.

A next equation describes how to calculate the number of users in a channel on a satellite from a gateway in terms of the supply of circuits on the ground. It constrains the channel allocation to provide enough circuits to satisfy the demand for each channel on a particular satellite. The number of circuits in a channel are limited by the term "N.ckt.Limit".

$$\sum_{g=1}^{g} c_{gscb} \leq N.ckt.Limit$$

The channel allocation is solved by maximizing traffic and minimizing power. This objective leads to minimum gateway to gateway interference. Thus, shared channels are not likely to be used in undersubscribed cases.

The number of circuits in a satellite beam on a channel (i.e., $C_{gscb}$) divides the power received at a traffic concentrator to determine the individual circuits "receive" signal power, or energy per bit Eb. The power received includes the variable, $X_{gscb}$ as the power from a gateway to a satellite on a beam in a channel.

The power limits include: instantaneous satellite power limit, instantaneous beam power limit, instantaneous Power flux density, and instantaneous gateway power limit.

Constraints

The state value has four subscripts, one for each object. The upper case letters represent the number of objects, wherein:

G=number of gateways;
S=number of satellites in the system;
C=the number of channels;
B=the number of beams; and
K=the number of grid points.

The system gains are defined as G, with subscripts for receiving, r, transmitting t, by the satellite s and gateway g.

The L represents power losses for the forward uplink and downlink. There are free space losses and miscellaneous losses. The S-beam antenna gains are incorporated as a function of elevation angle.

$$F1: \sum_{s=1}^{S}\sum_{g=1}^{G}\sum_{c=1}^{C}\sum_{b=1}^{B} G_{sr} \cdot G_{st} \frac{x_{gs,cb}}{L_{ufsl} \cdot L_{umisc}}$$

F2 is the constraint on gateway transmitted power. The limit on gateway power could be the result of the High Power Amplifier limit, or any equipment limitation. A gateway with only some of the CDMA equipment, or with limited terrestrial interfaces is represented as a power limit. There is a separate constraint for each gateway antenna=G*I constraint equations.

$$F2: \forall_{g,s} \sum_{c=1}^{C}\sum_{b=1}^{B} x_{gs,cb} - P_{hpa} \leq 0$$

F3 is the constraint on any satellite beam power to be 25% of the total satellite power. There is a constraint for every beam on every satellite=S*B.

$$F3: \forall_{s,b} \sum_{g=1}^{G}\sum_{c=1}^{C} G_{sr} \cdot G_{st} \cdot \frac{x_{gs,cb}}{L_{ufsl} \cdot L_{umisc}} - \frac{1}{4} P_{limit} \leq 0$$

F4 is the Power Flux Density constraint. It is calculated for each beam of each satellite. There are S*B of these constraints.

$$F4: \forall k \forall s, c \sum_{g=1}^{G}\sum_{b=1}^{B} \left\{ \frac{G_{sr} \cdot x_{gs,bc}}{L_{ufsl} \cdot L_{umisc}} \cdot \frac{G \cdot G_{st} \cdot G_r}{L_{dfsl} \cdot L_{dmisc}} \right\} \cdot \frac{4,000}{Bw \cdot Area_b}$$

F5 is derived from the limitation of instantaneous satellite power.

$$F5: \forall s \sum_{g=1}^{G}\sum_{c=1}^{C}\sum_{b=1}^{B} G \cdot \frac{G_{sr} \cdot x_{gs,bc}}{L_{ufsl} \cdot L_{umisc}} - P_{limit} \leq 0$$

Grid points are aggregations of active users. Grid points are assumed to receive different amounts of power. The power received depends upon the decision variable $pha_{gsb,k}$ and elevation and phi angles between the satellites in view and the grid point.

Diversity Model—Diversity Policy Implementation

A channel-sharing policy selected by the system's operator is input to the diversity implementation module. In the Globalstar™ network, unlike prior art fixed-tiling multiple-satellite cellular networks, two satellites can be assigned with the same link, for improved link reliability. Also, gateways can be assigned with the same channel in the same beam of the same satellite.

Each Globalstar™ satellite beam has 13 forward-link channels. The forward and return links in each call circuit each use a bandwidth of 1.25 Mhz in the S-band and the L-band, respectively. The links carry "packetized" digital voice and data signals that are convolutionally encoded and interleaved into a data stream that is then combined with a user code identifying the link's subscriber.

Each authorized request for access sets up a call "circuit", the end-to-end connections used by the call. When diversity is not implemented, each "link" is an individual, time-variable CDMA code allocation within an FDMA channel of a particular beam transmitted by a particular satellite. Each CDMA link is defined by a particular one of the 128-Ary Walsh codes that provide a maximum of 119 user-traffic links, a CDMA pilot link, a CDMA sync link, and a CDMA paging link, etc. within each FDMA channel for each beam of each satellite.

The SS pilot links for channels being transmitted by a beam generate an all-zeros Walsh code that is modulo-2 added to a short pseudo-noise (PN) code used to identify the transmitting satellite or ground terminal. The modulo-2 sum is the spread across the channels bandwidth by phase-shift keying (BPSK or QPSK). In the Globalstar™ satellite-cellular network, reverse link and forward-link beam hand-offs occur independently whenever a threshold level of the Signal-to-Noise Interference Ratio (SNIR) is reached by the respective link, measured with reference to its phase relation and strength relative to the channels pilot link signal. The handoff could return the call to the same circuit, if conditions improve or a suitable alternative is not found.

In a "soft handoff" the call is transferred by the network to a different CDMA link in the same FDMA channel. The new link-assignment is identified by the paging channel, using the new Walsh spreading code as its access parameter and perhaps also a pilot-identification code.

In a "directed" hard hand-off, the call is transferred to another channel. In the Globalstar™ network, whenever the last beam providing one of the links for a call circuit moves out of the line of sight, a hard handoff occurs. A new frequency is used. However, this is often avoidable because of the diversity allowed by this network, as was previously explained.

The channel diversity policy options provided by the presently-preferred embodiment of the present invention for use in respective service areas are:

Complete Partitioning—Requires that separate channels be assigned to overlapping beams while they cover this service area. Thus, each user call will only use the one satellite allocated to its assigned node. When that satellite's link-capacity limit is reached, other incoming calls from that node will be blocked.

Complete Sharing—Diversity Channels reused.

"Cutoff" Hybrid Partitioning—Permits the network operator to select a limit on the user calls from a service area that can be assigned to reused channels. (The sum of the thresholds for a region may be greater than the overall number of channels in the region.)

Europe is one region in the Globalstar™ network where some service areas include more than one country. Particular countries within given service areas may require dedicated channel numbers, while others may set diversity cutoffs to maximize the network's link carrying capacity in their area. A satellite footprint is large enough to encompass many multi-national service areas, many in the same beam.

Such areas require the more flexible channel-partitioning protocols than those available in the prior art networks.

The differences that are accommodated include practical, social, and economic concerns, as well as technology differences.

Different terminal types have different signal characteristics, requiring different signal-to-noise ratios (SNIRs). These operate most efficiently under respective satellite diversity strategies for the individual type of terminal: mobile, handheld, fixed or transportable.

For example, "rake-receiver" terminals need satellite diversity (i.e., at least two satellites for each of the links to these terminals) to support their advantageous coherent-combining function. Similarly, a fixed-location radio-telephone unit using a given channel may have a directional antenna that reduces its contribution to the SNIR for that channel. This permits the network to increase the number of links carried by that channel. The hybrid diversity protocols also permit dedicated channels to be reserved for terminals requiring specialized characteristics in each individual link.

In general, a two path or "dual-diversity" satellite allocation channel can change from one satellite area to another. The policy is suitable for a rake-receiver terminal capable of concurrently receiving redundant transmissions from the satellites. Prior art systems did not provide this diversity, nor permit areas to be defined in response to differences in market and regulatory requirements in respective areas. Because the spacing of nodes within a service area is substantially even, although the area covered by the nodes varies, the required distance between beams can be defined by a minimum number of intervening nodes. This reduces the occurrence of self-interference between beams.

The size of a beam's footprint is critical to the reuse of completely-partitioned frequencies. When a beam covers multiple service areas, only one of those areas can use any particular channel in that beam. For completely-partitioned frequencies, the more area a beam covers outside the completely-partitioned service area, the more link-capacity that could have been used outside that area is wasted, and the greater the loss of spectral efficiency. If only a single gateway's service area is covered, all 13 channels are available on each of the 16 beams to all user terminals illuminated by each beam. In contrast, a completely-shared control policy permits different satellites to use the same frequencies.

The number of circuits that can be supported in a channel depends upon the amount of signal power and noise detected at the user terminal. A "smoothed" value for each channel's time-variable capacity and a constant value for self-interference power are preferably used in selecting the elements of the barrier-value matrix. These provide improved accuracy for those estimates of the number of circuits that can be supported in each channel of each beam. For example, the present invention assumes the following for a world wide system:

two-path diversity/traffic node is the minimum, and three-path diversity is permitted;

all seven continental regions are divided into contiguous service areas that do not cross regional boundaries;

Each gateway supports one service area, and overlaps between gateways have their own distinct traffic nodes #Is;

then,

The allocation system is decomposable into the set of all satellite beams covering each given service area, (it can be determined independently by a given gateway in an emergency);

The allocation is extendable to a provider controlling multiple gateways/service areas, by analyzing them separately.

A minimum gateway configuration for the region including Europe (shown in FIG. 5) is as follows:

Orbit elevation=1414 km;

Gateways=6 (corresponding to 6 service areas);

Satellites visible at once to a node=5 to 7;

Beams/satellite=16 (from a 1–6–9 S-band antenna);

Look angles=10, 44.1 and 67.8 degrees;

Channels/beam=13;

Time visible at node=20 minutes;

Traffic nodes=74; and

Constant traffic volume=3 circuits/node.

The "look angles" are the elevation angles of the outer circumferences of respective concentric rings of beams.

In an exemplary case, the sum of the power transmitted for each channel varied by between 20 to 30 watts out of a total power of 40 watts, over a period of 4 minutes, whereas an optimum power strategy results in changes of only 4 watts out of 8 watts. Self-interference for the optimal power allocation averages about $2 \times 10^{-21}$ watts/Hz. For diversity, self-interference was about $2 \times 10^{31\ 20}$ watts/Hz, i.e., an order of magnitude higher.

Gateway-to-gateway and beam-to-beam interference terms were included in these interference measurements, but did not play a significant part since the same configuration was measured each time. Fortunately, the probability of outage is much lower for diversity: about 0.02 on average, in contrast to the optimally-weighted average value of about 0.3.

Instead of diminishing power fluctuations, diversity operation makes them worse. Link demand is larger, as are the fluctuations in that demand. The increased power variation during diversity operation is produced by the positive feedback effect of satellite-to-satellite self interference. A fixed-channel allocation is implemented for this gateway, which provides:

1) Optimal weighted power; and
2) 50% power balance across satellites.

The purpose of the diversity model is to predict the aggregate strategy of gateways for diversity path decisions. The diversity combiner in the forward link is a coherent amplitude combiner. The link equation is the sum of the signal to noise of each path. The return link uses a noncoherent diversity combiner. The link equation is the sum of signals divided by the sum of noises. The noncoherent combiner is linear. The coherent combiner can be bound by the linear noncoherent combiner using the following approximation. A constant combiner efficiency factor can be used to tighten the bounds.

$$\frac{\alpha_{gs1b1,k1} \cdot x_{gs1cb1,k1}}{N_1} + \frac{\alpha_{gs2b1,k1} \cdot x_{gs2cb1,k1}}{N_2} \geq$$

$$\frac{\alpha_{gs1b1,k1} \cdot x_{gs1cb1,k1} + \alpha_{gs2b1,k1} \cdot x_{gs2cb,k1}}{N_1 + N_2} \geq SNR$$

The following are simplifying assumptions:
1. satellite transponder gain and return link filter switching are modeled as a fixed constant;
2. the Forward Error Correction coder gain is not modeled;
3. imperfect power control is modeled as a fixed power margin;
4. Rayleigh fading is modeled as equal uncertainty on all fingers of the diversity combiner;
5. only mobile and handheld user terminals are modeled;
6. user signals are assumed to be orthogonal from the same gateway in the same channel, on the same satellite and beam;
7. Pilot power is modeled as a constant per channel; and
8. Beacons, which are used for cold acquisition, are modeled as a constant per satellite.

The forward link closure model is described as an analytical expression for Signal-to-Noise Interference ratio at the user terminal. The forward link model considers the effects of the diversity combiner and the general interference environment. The decision parameter x is the power allocated from a gateway g to a satellite s, over a channel c, and in a beam b. The forward link model aggregates users to grid points k. The power variable $X_{gs,cb,k}$ is the power allocated to a grid point. The notational convention is the same as in Table 1.

The received signal power at grid point k from the gateway g, through the satellite s, and over the channel c and through the beam b is:

$$S_{gs,cb,k} = G_s^a(S_{s,b}) \cdot \frac{G_g^t \cdot G_s^r}{L_{g,s}^u \cdot L_{misc}^u} \cdot \frac{G_{s,b}^t \cdot G_k^r}{L_{sb,k}^d \cdot L_{misc}^d} \cdot x_{sg,cb,k} = \alpha_{gsb,k} \cdot x_{sg,cb,k}$$

The path gain matrix, $\alpha_{gsb,k}$, is a function of the elevation angle between grid point k and beam b of satellite s, and the elevation angle between the gateway g and the satellite s. If the grid point or the gateway cannot see the satellite (i.e., that is an elevation angle less than 10 degrees), than $\alpha_{gsb,k}=0$ Channels are allocated to grid points. The number of users at a grid point, on a particular channel is Cm (k,c,m). The index m is the mode, which may be either handheld, mobile, or fixed. At any point in time these users can be translated to an equivalent number of user circuits required on a satellite.

The received signal power for any one user from the gateway g through beam b of the satellite s is represented by:

$$u_{gs,cb,k} = \frac{S_{gs,cb,k}}{C_{gscb,k}}$$

where $C_{gscb,k}$=the number of users in channel c, on satellite s, and in beam b, and which are assigned to the gateway g at grid point k.

In general, there are a different number of users in each satellite beam associated with a finger of diversity path. The user received signal is the coherent summing of the signal amplitudes of each finger. The user's signal energy per data bit is represented by:

$$\forall\, g, c, k$$

$$E_b = T_b \cdot \frac{S_{gs,<b,k} - A_{gs,b,k}}{C_{gscb,k}}$$

where $A_{gs,b,k}$ represents the assignment for services of the grid point k by the gateway g through the beam b of the satellite s; and where $W_{sb}$ is the combiner weight. The elements are "1" if the grid point k is located in the service area of the gateway g, and is "0" otherwise.

The total noise power spectral density due to thermal noise, self-interference is the sum of:

thermal noise for each finger,

Is, which represents self-interference due to non-orthogonal coded signals (these signals are all of the signals from the same gateway, in the same channel, through other satellites), Ib, which represents adjacent beam interference from all sources in channel c, at grid point k, from beams other than the main beam, and Ig, which represents other service area interference due to signals from other gateways, but in the same channel.

$$N_0 = A_{gs,b,k} \cdot (\eta_{ok} + T_c \cdot I_{o,gscb,k})$$

The term $I_{o,gscb,k}$ includes all interference terms, namely, Is, Ib, and Ig.

The total interference includes all adjacent channels' interference and external interferences. The variables are as follows:

Ic=adjacent channel interference from all sources in the channel c, at the grid point k (this is modeled as a constant (e.g., (3%)) factor of the received signal power); and Iext=external interference from other CDMA service providers and from satellites in the adjacent spectrum.

The optimization model is comprised of a constant matrix containing the path gain and constrains on the decision variable $x_{gs,cb}$. The entire link can be represented as a constant path gain matrix. This path gain is a function of gains from gateway to satellite to grid point at a point in time. There is one constraint equation per grid point.

Pilot Power

The pilot power uses the same link balance calculation with a different SNIR. There are two kinds of pilots:

a) a pilot used for user terminal acquisition; and b) a pilot used to provide the PN reference signal (one beam per gateway is required).

The model formulation allows a different SNIR for either type of pilot.

Overview

The channel-allocation system in accordance with the present invention comprises a user model 202, a channel allocation model 206, and a gateway channel model 204. Concurrently used, these models determine the value for each forward channel on each satellite. Further components of the above are a traffic-node definition module, and a diversity policy implementation module.

The satellite-power optimization barrier-value matrix limits the maximum number of links permitted in each of a satellite's forward channels. The power barrier value is selected to optimize the allocation of satellites available to support traffic in respective satellite coverage areas, for efficient use of satellite battery-power resources.

The node-definition module modifies the satellite allocation provided by the barrier-value matrix using a Greedy-algorithm linear-programming solution technique. This solution technique assigns predicted traffic volume in the neighborhood of respective fixed terrestrial node points to a channel provided by a beam on the highest elevation satellite, wherever possible.

Preferably, when a policy of complete partitioning is selected for the channels in a service area, most of the beams footprint is within the service area.

The diversity implementation module uses the foregoing assignments to accommodate a given level of satellite-diversity links for each link assigned to traffic at each node. The accommodation uses the node-definition module to re-assign the channels if more links are needed for at a given node.

The flexible node definition in accordance with the present invention compensates for fluctuations in the geographic distribution of link demand. The link-capacity of the nodes is assumed to be a "slack" variable on a first pass over each predetermined group of nodes that uses a nominal satellite-beam geometry. The allocation is corrected, if more link capacity is required, by one or more subsequent passes across that group of nodes.

The diversity implementation module compensates for diversity's tendency to aggravate fluctuations in link demand by adding a feedback path that allows the node-definition module to reassign links so as to smooth the link fluctuations caused by diversity.

The invention also provides analytic graphical summaries for an allocation review process that permits inefficient channel allocations to be identified, diversity policies and node mapping to be reviewed, and corrected barrier values to be supplied, before a new schedule of allocations is determined for the network's next planning period.

In a particular embodiment, the analytic graphical summaries provide an area-wide review as soon as the channel-allocation plan for a predetermined group of neighboring fixed node points in that area is determined.

The node-definition module substantially decouples diversity implementation from the selection of a barrier-function matrix that solves the network's battery-power allocation problem. The node-definition module accomplishes this by associating channels with particular variable "virtual-area" traffic nodes that are fixed as a grid of points on the ground surrounded by clouds of user-demand for links that vary in their geographic extent over Lime.

In a particular embodiment of the invention, a barrier is also selected in accordance with a dynamic constraint that limits the occurrence of hard-handoffs.

The number of channels used in the final allocation is determined for geographical traffic-nodes having time-variable coverage-area definitions that minimize power consumption relative to the traffic-volume distribution predicted for multiple nodes in a region. The determination is accomplished by more evenly distributing link demand among the satellite's channels so that its self-interference is minimized.

User-traffic allocations in accordance with the present invention solve the problem of optimizing the use of new channels by preferring the assignment of new calls to underused channels. This minimizes the occurrence of channel-frequency changes in response to local traffic density changes.

In another embodiment, the channel allocation system is used as a component of a gateway associated with a particular service area within the network having a given diversity policy. In this embodiment, the gateway receives actual service requests, and provides channel allocations limited to information local to that one respective service area.

In one embodiment gateways also assign the shared-channel frequencies through gateway-to-gateway communications rather than indirectly through a centrally-planned channel-allocation plan for a given planning period, for the sake of increased responsiveness to unanticipated changes in traffic distribution.

Despite the finding that link-diversity increases the signal degradation caused by slow, orbital changes satellite elevation above the horizon, it has been found that the problems of signal fading and signal blockage and outages that are peculiar to satellite cellular networks are advantageously addressed by providing a selected level of additional "satellite diversity" links for respective service areas in the satellite-channel allocation, so as to support the use of coherent-combiner receivers in those areas.

In accordance with the present invention, an improved channel allocation method allows a multiple satellite network to use overlapping beams and hybrid FDMA/CDMA encoding for taking full advantage of the variable number of links available to it. In particular, it can take advantage of a plurality of discontinuous bandwidths available in a portion of the spectrum that is particularly advantageous for LEO satellite-cellular network operation.

The invention has been described with particular reference to preferred embodiments thereof. It will be understood by those skilled in the art that variations and modifications are possible within the spirit and scope of the invention.

For example, the virtual-node traffic allocation and diversity-policy implementation can be carried out independently by an individual region or gateway, if necessary. The invention may be employed for use with Medium earth orbit (MEO) instead of LEO satellites. Also, other suitable encoding techniques may be employed, and the graphical analysis may be wholly, or in part, computer-implemented using a suitable set of topological criteria.

The invention is defined by the appended claims.

APPENDIX

Partition-Allocation Subroutine 'zassigntv.m'

This pseudo-code allocates channels to the links for a predicted traffic distribution. It is independent of satellite motion, except visibility and elevation data for the nodes at a given time. The parameters used set the scope of the allocation: worldwide, regional, a gateway, or a beam.
The input value "lkpch" that limits the number of links allowed, is preferably a dynamic value. The lkpch limits the links per channel to optimize battery operation. The use of diversity channels in overlapping beams is controlled by "label matrix" $C_d$ in the subroutine 'ztimeV2.m' that is called at the end of 'zassigntv.m'.

$C_p$ = matrix allocating C/B*S (input to 'ztimeV2.m');
$C_l$ = matrix allocating L*K/C*S (input to 'link-power');
COLOR = list of C# instances;
R, G, K = number of regions, gateways, nodes;
L, C, B, S = number channels, beams, satellites;
lkpch = list of L/C#*B#*S# (battery-power allocation);
Ksa = list of nodes served by a gateway K#/G#;
Klat = list of K# node-latitudes/G#*R;
Klong = list of K# node-longitudes/G#*R;
Tsa = R*GXK matrix of link demand/K# set using mode factors: Mobile, Fixed, Handheld, Transportable see = S*BXK matrix of binary line-of-sight satellite beam visibility (o or 1)/K#;
Sat1&2 = first-highest & second-highest satellite/K#.

Step 1 -- INITIALIZE REGIONAL PARAMETERS for R#

A. GET for G# in R#:

Knew = sub-set of the matrix Ksa for G#
Tnew = sub-set of forward-link demand Tsa/Knew
Snew1 = sub-set of Sat1/Knew
Snew2 = sub-set of Sat2/Knew B. BUILD MATRIXES for G# in R#:

Bk = matrix of B#*S/K# for Sati & Sat2 from See
Ek = KxK matrix of Euclidean distances between traffic nodes in Knew using Klat and Klong
Nn = KxK matrix of nearest-neighbors, from Ek C. ACCUMULATE reference value Ktot = sum of Knew Step 2 -- BUILD CHANNEL SETS (Chs) for G# in R#

A. SET size of Chs# the channel set for Knew/G# size = Ktot − (n + 1) where the n iteration index (the initial value of n is −1)

B. GET for the size of Chs#

Ts = a subset of the Tnew matrix for Chs#
Ls = a subset of the Lnew matrix for Chs#

C. ACCUMULATE reference values for the size of Chs#

Ttot = total link-demand in the Ts matrix for Chs#
Ltot = total link-capacity in the Ls matrix for Chs#

Step 3 -- TEST NUMBER OF CHANNELS for Chs# in G#

A. IF Ttot > Ltot

GET new Chs# + Chs# + 1 = old Chs#
(respective sets of nearest neighbors from Nn)
SET new Chs/G# = Chs# + 1
RETURN to Step 2 to BUILD the new Chs# and Chs# + 1

B. OTHERWISE,
UNLESS Chs# = Chs/G# at this point RETURN to Step 2B
UNLESS #G = G at this point RETURN to Step 1A Step 4 -- REVISE ALL CHANNEL SETS for G# in R#

A. BUILD matrix cc of Chs# centers (lat, long), where

APPENDIX-continued

Chs# centers (lat, long) = δ lat/2, δ long/2 (δ = maximum − minimum Klat and Klong values)
B.  SET search box size = to the nominal width and length of Ks = C + S traffic nodes from nn
C.  ASSIGN unlimited "greedy-label" numbers N# = 1 to N for each C# within the Chs# box, by sliding the Chs# box to successive contiguous positions so as to tile the map of G# without overlap
D.  IF in Chs# the N <= CIG# then CONVERT greedy N#1s to C#1s between 1 and C, using uniform-distribution randomization
    UPDATE the number of instances of these C#1s in COLOR list
    IF "sum of" COLOR <= "sum of" Knew then
RETURN to Step 1 for next G# in R#
OTHERWISE, go to 'ztimeV2.m' subroutine for G#
E.  OTHERWISE, until max N# <= C, recursively:

PRINT "BOX IS TOO LARGE"
    REDUCE search box newsize (n + 1) = size − (n + 1)
    ASSIGN new labels $N\#_{n+1}$ by sliding the (n + 1) search box successively through each Chs# on regional map starting from the Chs# map-matrix position 1, 1
    IF max $N_{n+1}\#$ > C then return to Step 4E
    OTHERWISE, go to 'ztimeV2.m' subroutine for G#.

Diversity/Graphing Subroutine lztimeV2.mv

This pseudocode reallocates channels to provide diversity in overlapping beams subject to the GS*C diversity level using the greedy labels N# assigned in 'zassigntv.m'. It then completes channel allocation by adding it to a graphical database. New parameters are:
chopt =  diversity option (CP/SC/CO),
GS*C =  desired (SCICO) diversity level, and
$C_d$      diversity matrix for all $C_p$ where R# = R.

Step 1 DETERMINE DIVERSITY POLICY:

IF chopt = CP go the Step 3

Step 2 -- REVISE THE $C_P$ ALLOCATION in R# (in G#)

A.  REMOVE internal boundaries

BUILD Bi = all beams i#/K# from see for R# (G#)
    CONVERT Bi to Ki a list of K#/i# for R# (G#)
B.  REVISE C# allocation for R# (G#)

BUILD MATRIX Cj of unassigned channels j# for K# where C*B*S Ctot in R# (G#)
    SET Cn GS*TD Td for additional channels needed
C.  REVISE each K# in Cp/R# (G#)

IF Cn < j# in K#, for each K#
    ASSIGN beams i#/S# in Cj and Ki
ELSE, CALL 'zassigntv.m' to revise $C_P$ for more j#/G#
IF S#'s of beams #i/#S in Cj and Ki are in Bk (from 'zassigntv.m')
CONVERT the greedy N#'s into an equivalent C#'s/i# from 1 to C, using uniform-distribution randomization. (Where i# overlaps other beams, use the previously assigned C#vs.)
ELSE, IF C#/i# in $C_4$ > GS*C
    PRINT "EXCESS DIVERSITY"
ELSE, CONVERT the greedy N#'s into equivalent C#'s/i# from 1 to C, using uniform-distribution randomization. (Where i# overlaps other beams, use the previously-assigned C#'s.)
UNTIL G# = G/R# return to Step 2C Step 3 -- GRAPHICAL ANALYSIS OVER TIME A.  PLOT data for all satellite beams as:

tracing of maximum channels/beam/minute for each satellite's beams.
    tracing of cumulative signal power/channel/minute for each satellite's beams.
B.  PLOT local allocations of links per channel as:

color-coded map of COLOR list of C# links/node

APPENDIX-continued

C. UNTIL R# = R RETURN to Step 1 at this point
D. REVISE diversity policy:

REVIEW maps and tracings of system performance
    REVISE as required by system performance criteria
E. END (until R# = R in the next two-week plan process)

What is claimed is:

1. A satellite communication system operative with at least one existing terrestrial communication system for carrying communication traffic, comprising:

a constellation of satellites in earth orbit, each of said satellites transmitting one or more links containing said traffic to one or more terrestrial users;

one or more terrestrial gateways, said gateways being linked to one or more satellites in said constellation for carrying said traffic, each of said gateways associated with a geographically limited cell;

a computing center, operatively associated with said communication system; and a communication link allocation system within said computing center for calculating optimized available resources and for allocating said traffic according to said optimized resources for a specific cell, said communication link allocation system comprising:

a first computer module constructed to generate and store a geographic definition of a cell including the communications resources available thereto and the power constraints related to said resources;

a second computer module constructed to generate and store a user traffic model based on historic user demands related to said cell over time, including data relating to channel changes for connected links;

a third computer module constructed to generate and store an optimized performance objective in the form of a barrier function which penalizes allocations which cause excessive channel changes to links in said cell over time; and wherein said communication link allocation system calculates a solution for optimum traffic allocation for traffic within a cell at a particular time, at least in part based on said data in said first, second, and third computer modules.

2. In a satellite communication system operative with at least one existing terrestrial communication system, said communication system comprising a constellation of satellites, a plurality of terrestrial user terminals, and at least one terrestrial gateway for establishing communication links between the user terminals and the terrestrial communication system via one or more of the satellites, a method of allocating communications traffic comprising the steps of:

generating and storing a geographic definition of a cell including the communications resources available thereto and the power constraints related to said resources;

generating and storing a user traffic model based on historic user demands related to said cell over time, including data relating to channel changes for connected links within a cell overtime; and generating and storing an optimized performance objective in the form of a barrier function which penalizes allocations which cause excessive channel changes to links in said a cell over time; and calculating a solution for optimum traffic allocation for traffic within a cell at a particular time, at least in part based on said data generated and stored in said prior steps.

\* \* \* \* \*